United States Patent [19]
Taniguchi et al.

[11] Patent Number: 6,146,308
[45] Date of Patent: Nov. 14, 2000

[54] CREEP TORQUE CONTROL OF INFINITELY VARIABLE TRANSMISSION

[75] Inventors: Takao Taniguchi; Shoichi Miyagawa; Kazumasa Tsukamoto; Shiro Sakakibara; Takeshi Inuzuka; Masashi Hattori; Hirofumi Nozawa, all of Anjo, Japan

[73] Assignee: Aisin Aw Co., Ltd., Anjo, Japan

[21] Appl. No.: 08/941,278

[22] Filed: Sep. 30, 1997

[30] Foreign Application Priority Data

Oct. 3, 1996  [JP]  Japan ................................. 8-263344
Nov. 6, 1996  [JP]  Japan ................................. 8-294192

[51] Int. Cl.⁷ ........................... F16H 37/02; B60K 41/00
[52] U.S. Cl. ............................. 477/48; 477/45; 475/211
[58] Field of Search ....................... 477/45, 46, 48; 475/211

[56] References Cited

U.S. PATENT DOCUMENTS

| | | | |
|---|---|---|---|
| 4,990,127 | 2/1991 | Roberts et al. | 475/211 |
| 5,011,458 | 4/1991 | Kumm | 477/49 X |
| 5,813,933 | 9/1998 | Tsukamoto et al. | 477/45 X |
| 5,961,418 | 10/1999 | Taniguchi et al. | 477/47 |
| 5,971,887 | 10/1999 | Hattori et al. | 477/41 |

FOREIGN PATENT DOCUMENTS

| | | |
|---|---|---|
| A2-0 733 829 | 9/1996 | European Pat. Off. . |
| A2-0 779 453 | 6/1997 | European Pat. Off. . |
| A1-0 781 940 | 7/1997 | European Pat. Off. . |
| 834680 | 4/1998 | European Pat. Off. . |
| 838613 | 4/1998 | European Pat. Off. . |
| A1-196 31 294 | 2/1997 | Germany . |
| 10-110802 | 4/1998 | Japan . |
| 10-115357 | 5/1998 | Japan . |
| 2 284 870 | 6/1995 | United Kingdom . |

Primary Examiner—Khoi Q. Ta
Attorney, Agent, or Firm—Oliff & Berridge, PLC

[57] ABSTRACT

In a neutral N control for substantially equalizing axial forces to act on two pulleys, a belt type continuously variable transmission (CVT) self-converges into the gear neutral point (GN) at which the output shaft RPM takes the value 0. When the convergence is made to the GN point to establish a no-load state, the CVT establishes a force $F_A$ to converge into a pulley ratio of 1.0, in which it is stabilized by itself. A converging force $F_N$ to the GN point and the force $F_A$ toward the pulley ratio of 1.0 are repeated in a vortex shape in the load state and in the no-load state to establish a creep force. This creep force can be modified by generating a force $F_O$ against the force $F_A$.

14 Claims, 20 Drawing Sheets

Clutch Application Table

| Range | | Clutch $C_L$ | $C_H$ |
|---|---|---|---|
| P | | | |
| R | | ○ | |
| N | | | |
| D | Low | ○ | |
| | High | | ○ |

− Single Chamber Area Difference Set Type −

SUBROUTINE OF "R" START CONTROL

CREEP TORQUE CONTROL OF INFINITELY VARIABLE TRANSMISSION

BACKGROUND OF THE INVENTION

1. Field of the Invention

The invention relates to an infinitely variable transmission (IVT) which establishes a torque circulation in combination with a planetary gear, and an infinitely variable transmission using a belt type continuously variable transmission and, more particularly, to an infinitely variable transmission for establishing a neutral state by the torque circulation.

2. Description of Related Art

Recently, in order to improve fuel consumption rate and drivability, an automatic transmission has been used in which a belt type continuously variable transmission (CVT) is mounted as the transmission of a vehicle.

Conventionally, as disclosed in Japanese Patent Laid-open No.6-331000, an infinitely variable transmission is known which includes a continuously variable transmission, a constant speed mechanism and a planetary gear mechanism so that a shift range may be maximized by synthesizing the power from the planetary gear mechanism and the constant speed mechanism in the planetary gear mechanism, in order to establish a power (or torque) circulation in the continuously variable transmission. In this infinitely variable transmission, the engine output is transmitted through the constant speed mechanism to a carrier and further through the continuously variable transmission and a first (low) clutch or a one-way clutch to a sun gear. In this state, as the torque circulation occurs in the continuously variable transmission so that its gear ratio increases from a low (O/D) to a large (U/D), the gear ratio of the output shaft of the infinitely variable transmission from a ring gear changes in the direction of backward →∞ (at the output RPM of 0)→forward high (U/D)→forward low (O/D). When the first clutch or the one-way clutch is released such that a second (high) clutch is applied, the rotation from the continuously variable transmission is transmitted directly to the output shaft so that the rotational ratio of the output shaft is shifted from high (U/D) to low (O/D) as the gear ratio of the continuously variable transmission changes from high (U/D) to low (O/D).

In the infinitely variable transmission establishing the torque circulation, by setting the gear ratio of the continuously variable transmission to the value predetermined by the gear ratio of the planetary gear mechanism, a gear neutral position exists in which the RPM of the output shaft is geometrically at 0. As a result, the infinitely variable transmission is theoretically constructed without any starter unit such as a starter clutch or a torque converter.

In the infinitely variable transmission described above, however, even if the gear neutral position theoretically exists, the output torque diverges to infinity in the vicinity of the neutral position. As a result, the output torque changes a lot when the continuously variable transmission deviates slightly from the predetermined gear ratio for the neutral point. Actually, it is difficult to hydraulically control the axial forces to act on the two pulleys of the belt type continuously variable transmission to set/hold the pulley ratio at the target gear ratio for the neutral position.

Therefore, the industry lacks an infinitely variable transmission (IVT), in which the belt type continuously variable transmission is automatically converged to the gear neutral position by equalizing or confining within a predetermined range the axial forces to act on two primary and secondary pulleys.

In such an infinitely variable transmission, the torque ratio diverges to infinity in the gear neutral position. It takes an extremely large value in the vicinity of the neutral position. Thus, the input torque to the infinitely variable transmission has to be limited because it is regulated by the allowable transmission torque capacity of a transmission element of the infinitely variable transmission, especially the belt of the CVT.

Furthermore the industry lacks an infinitely variable transmission which generally employs an internal combustion engine as its prime mover. In the vicinity of the gear neutral position (at a vehicle starting time) in which the torque ratio takes the maximum, the throttle opening is suppressed to an extremely small value (e.g., about 5%) by the limit of the input torque. Even the engine output by the extremely small opening throttle can satisfy the necessary torque because the infinitely variable transmission takes the maximum torque ratio. In the extremely low opening of the throttle, however, an equi-throttle curve of the engine output characteristics has a tendency to go down rightwards so that the engine RPM drops a lot. As a result, even when a driver depresses the accelerator pedal to accelerate the vehicle, a sufficient torque is outputted, but the engine RPM remains at a low level. When the CVT is up-shifted (or shifted in the U/D direction) to raise the engine RPM, however, sufficient torque cannot be outputted.

These characteristics provide a physical disorder to the driver because they are different from those of the characteristics of a starter unit such as a conventional torque converter. Specifically, as the accelerator pedal is depressed, the engine RPM is raised accordingly, and the input torque of the transmission is increased.

SUMMARY OF THE INVENTION

It is therefore an object of the invention to provide an infinitely variable transmission which includes a continuously variable transmission to be automatically converged to a gear neutral position, and which can be started smoothly by generating a desired creep torque at the time of starting.

It is also an object of the invention to control the engine properly, even if the infinitely variable transmission is of the type in which the throttle of the engine is initially suppressed to an extremely low opening to restrict the input torque to the infinitely variable transmission in accordance with the torque amplification ratio by the torque circulation.

In order to achieve the aforementioned objects, the infinitely variable transmission comprises: an input shaft connected with an output shaft of an engine; an output member connected with wheels; a belt type continuously variable transmission including a first pulley associated with the input shaft, a second pulley, a belt movable on the pulleys, and axial force actuating means for applying axial forces to the first and second pulleys to change the rotational ratio of the two pulleys. The belt type continuously variable transmission has a first pulley ratio of a gear neutral state, at which the RPM of the output member has a value 0, and a second pulley ratio at which the belt type continuously variable transmission is in an unloaded state based on the first pulley ratio and is of itself in a stable state; a planetary gear including at least first, second and third rotary elements associated with the input shaft, the second pulley and the output member, respectively, so that a torque transmission direction may be changed between the two pulleys, and so that the output torque direction of the output member may be changed on the basis of a change in the pulley ratio of the belt type continuously variable transmission; and a creep torque generating means for generating a creep force, by which the belt type continuously variable transmission is directed toward the second pulley ratio from the gear neutral state in which the axial forces that act on the two pulleys are set to predetermined values, so that a self-convergence may be effected to the first pulley ratio.

Furthermore, the creep torque generating means sets the axial forces that act on the two pulleys in accordance with a necessary creep torque.

The creep torque generating means sets the axial forces that act on the two pulleys so that the creep torque to be generated may be substantially 0.

The axial force actuating means includes hydraulic actuators, individually provided for the two pulleys and having oil pressure chambers to be fed with oil pressure. The effective pressure receiving areas of the two oil pressure chambers are set so that the creep torque to be generated by the creep torque generating means may be substantially 0 when equal oil pressures are fed to the two oil pressure chambers.

When the pulley ratio of the belt type continuously variable transmission is at the first pulley ratio in a D-range, the oil pressure to be fed to the oil pressure chamber of the second pulley is made to be higher than that of the first pulley. In an R-range, the oil pressure to be fed to the oil pressure chamber of the first pulley is made to be higher than that of the second pulley. The creep torque generating means generates a forward creep torque in the D-range and a backward creep torque in the R-range.

The first pulley ratio is set at a more overdrive side than the second pulley ratio, and the creep torque generating means generates the creep torque in the forward direction.

The creep torque generating means sets the axial force actuating means so that the axial forces that act on the two pulleys may be substantially equalized.

The axial force actuating means includes hydraulic actuators individually provided for the two pulleys and having oil pressure chambers. The two oil pressure chambers have equal effective pressure receiving areas and are fed with equal oil pressures.

The infinitely variable transmission comprises a clutch interposed between the input shaft and the first rotary element of the planetary gear. At the gear neutral state in the D-range, the creep torque generating means generates a forward creep torque. At the gear neutral state in the R-range, the belt type continuously variable transmission sets a backward pulley ratio and applies the clutch gradually.

When a brake pedal is released, the creep torque generating means controls the axial forces that act on the two pulleys so that a predetermined creep torque may be generated.

The creep torque generating means controls, when a throttle pedal is actuated by a driver, the axial forces that act on the two pulleys so that a creep torque according to the depression of the pedal may be generated.

The infinitely variable transmission comprises an electronic throttle control means for controlling a throttle opening when starting from the gear neutral state, within a throttle opening, in which the output torque of the engine is within a limited torque set according to the pulley ratio of the belt type continuously variable transmission, such that the RPM of the engine may be a target RPM according to the amount of actuation of a throttle pedal actuated by a driver.

The electronic throttle control means controls the throttle opening to the output torque, as set according to the ratio of the amount of actuation of the accelerator actuating means, with respect to the limited torque which is based on the throttle opening by the electronic throttle control means when the accelerator actuating means is activated to the maximum.

With the structure described above, the engine output from the input shaft is properly speed-changed through the belt type continuously variable transmission and transmitted to the second rotary element of the planetary gear, and a constant speed rotation is transmitted to the first rotary element. The two rotations are synthesized in the planetary gear and transmitted from the third rotary element through the output member to the drive wheels. At this time, a torque circulation is established so that the rotational direction of the output member is switched forward and backward across the gear neutral position, in which the rotation of the output member is at 0, in accordance with the pulley ratio of the continuously variable transmission.

For example, in the gear neutral state in which the axial force actuating means substantially equalizes the axial forces that act on the two pulleys, the belt type continuously variable transmission self-converges to the first pulley ratio at which the output member rotation is at 0. When the belt type continuously variable transmission converges into the gear neutral position to establish a no-load state, it establishes a force to converge its own stable position, e.g., the second pulley ratio of 1.0. At the instant when the belt type continuously variable transmission manipulates the first pulley ratio to have no load on the basis of a converging force to the first pulley ratio, the force to the second pulley ratio is established so that the two forces move into a vortex state to establish a predetermined creep force.

By making different axial forces act on the two pulleys by the axial force actuating means, for example, the creep force can be changed to establish a force against the force toward the second pulley ratio.

BRIEF DESCRIPTION OF THE DRAWINGS

The invention will be described reference to the drawings in which.

DESCRIPTION OF THE PREFERRED EMBODIMENT

Figure 1:
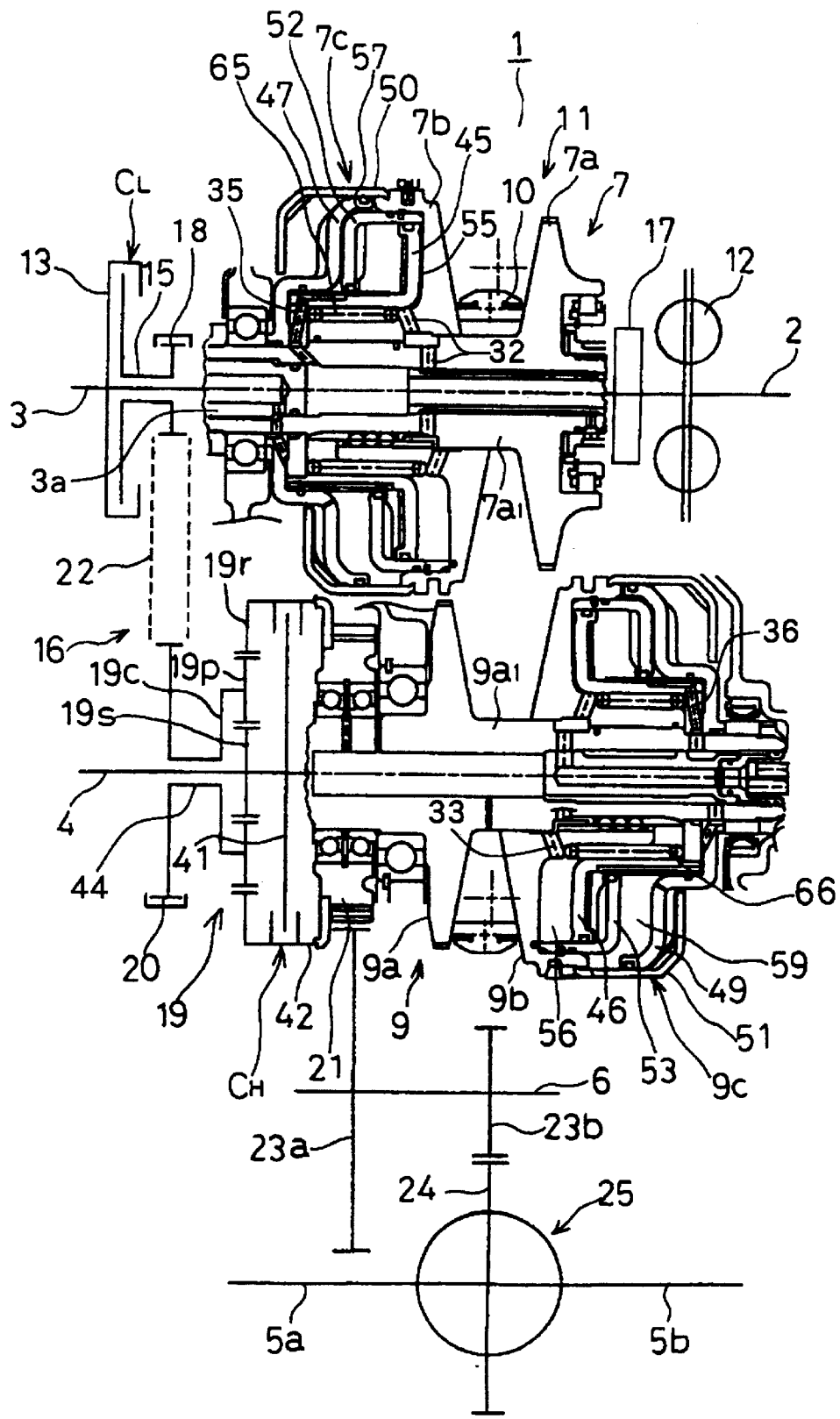
FIG. 1 is a front elevational view showing an infinitely variable transmission according to the invention.

The invention will be described in connection with its embodiments with reference to the accompanying drawings. An infinitely variable transmission 1 to be mounted on a vehicle is equipped, as shown in FIG. 1, with a first shaft 3 aligned with an engine crankshaft 2, a second shaft 4, a third shaft 5 (a, b) aligned with front axles, and a fourth shaft 6 made of a counter shaft. A primary (or first) pulley 7 is arranged on the first shaft 3. A secondary (or second) pulley 9 is arranged on the second shaft 4. A belt 10 is movable on the two pulleys 7 and 9, thus providing a belt type continuously variable transmission 11.

Moreover, the first shaft 3 is directly connected to the engine crankshaft 2 through a damper unit 12 for absorbing torque fluctuations in the engine, to form an input shaft. This input shaft 3 includes a stationary sheave 7a of the primary pulley 7 and a shaft 3a splined to a boss $7a_1$ of the stationary sheave 7a. On the shaft 3a forming the input shaft 3, moreover, there is fixed an input side member 13 of a low clutch $C_L$, and there is rotatably supported an output side member 15 of the low clutch $C_L$. To this output side member 15, there is integrally connected a primary side sprocket 18 of a constant speed transmission unit 16. An oil pump 17 is connected to the stationary sheave 7a, as forming the input shaft 3, of the primary pulley 7, and a movable sheave 7b is supported on the stationary sheave 7a so as to be axially moved by a later-described hydraulic actuator 7c.

The second shaft 4 includes a stationary sheave 9a of the secondary pulley 9, and a movable sheave 9b is supported on the stationary sheave 9a so as to be axially moved by a hydraulic actuator 9c. On the second shaft 4, moreover, there are arranged a high clutch $C_H$ and a planetary gear 19, and there are rotatably supported a secondary side sprocket 20 and an output gear (or output member) 21.

The planetary gear 19 is a single pinion planetary gear which includes a sun gear 19s, a ring gear 19r and a carrier 19c rotatably supporting a pinion 19p meshing with the two gears. Moreover, the sun gear 19s is connected to the stationary sheave 9a, as forming the second shaft 4, of the secondary pulley 9 to provide a second rotary element; the ring gear 19r is connected to the output gear 21 to provide a third rotary element; and the carrier 19c is connected to the secondary side sprocket 20 to provide a first rotary element. Moreover, a wrapping member 22 such as a chain, e.g., a silent chain, a roller chain or a timing belt, runs on the primary and secondary side sprockets 18 and 20. The high clutch $C_H$ is interposed between the sun gear 19s and the ring gear 19r.

The output gear (or output member) 21 is in meshing engagement with a large gear 23a of the counter shaft 6 forming the fourth shaft, and a small gear 23b of said shaft is in meshing engagement with a ring gear 24 of a differential unit 25, which outputs differential rotations to the left and right axles 5a and 5b forming the third shaft.

The hydraulic actuators 7c and 9c of the primary pulley 7 and the secondary pulley 9 are equipped with partition members 45 and 46 and cylinder members 47 and 49, which are fixed on the stationary sheave bosses $7a_1$ and $9a_1$, and drum members 50 and 51 and second piston members 52 and 53 which are fixed on the backs of the movable sheaves 52 and 53, respectively. The partition members 45 and 46 are fitted oil-tight in the second piston members 52 and 53. The second piston members 52 and 53 are fitted oil-tight in the cylinder members 47 and 49 and on the partition members 45 and 46, to provide the hydraulic actuators 7c and 9c the double piston (or double chamber) structures which include first oil pressure chambers 55 and 56 and second oil pressure chambers 57 and 59, respectively.

The first oil pressure chambers 55 and 56 in the hydraulic actuators 7c and 9c form such piston faces, respectively, at the backs of the movable sheaves 7b and 9b that their effective pressure receiving areas are equalized at the primary side and at the secondary side. In the primary side and secondary side stationary sheave bosses $7a_1$ and $9a_1$, there are formed oil passages 32 and 33 communicating with the first oil pressure chambers 55 and 56, and oil passages 35 and 36 communicating with the second oil chambers 57 and 59, respectively. In the stationary sheave bosses $7a_1$ and $9a_1$, there are mounted, under compression, pre-loading springs 65 and 66 for urging the primary side and secondary side movable sheaves 7b and 9b, respectively, toward the stationary sheaves 7a and 9a.

The operations of the infinitely variable transmission 1 are explained with reference to FIGS. 1, 2 and 3. The rotations of the engine crankshaft 2 are transmitted through the damper unit 12 to the input shaft 3. In a D-range and in a low mode with the low clutch $C_L$ being applied but the high clutch $C_H$ being released, the rotations of the input shaft 3 are transmitted not only to the primary pulley 7 but also to the carrier 19c of the planetary gear 19 through the constant speed transmission unit 16, which includes the primary side sprocket 18, the wrapping member 22 and the secondary side sprocket 20. The rotations of the primary pulley 7 are continuously changed in speed, as the pulley ratio between the primary and secondary pulleys is properly adjusted by the later-described hydraulic actuators 7c and 9c, and are transmitted to the secondary pulley 9, the speed-changed rotations of which are further transmitted to the sun gear 19s of the planetary gear 19.

Figures 2, 3:
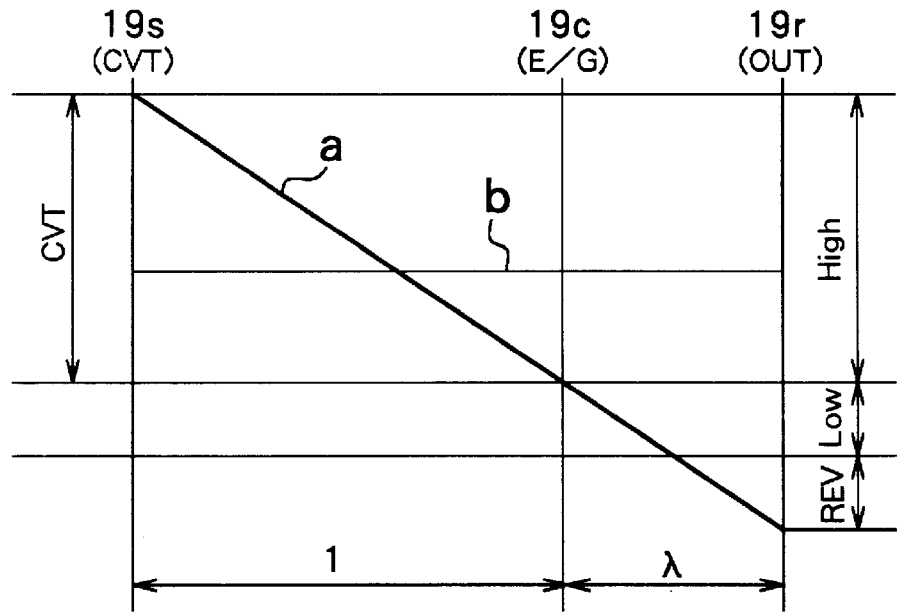
FIG. 2 is a velocity diagram of the infinitely variable transmission of FIG. 1.
FIG. 3 is a diagram tabulating applied states of individual clutches.

In the planetary gear 19, as illustrated in the velocity diagram of FIG. 2, the carrier 19c, to which the constant speed rotations are transmitted through the constant speed transmission 16, acts as a reaction element, and the continuously variable rotations from the belt type continuously variable transmission (or CVT) 11 are transmitted to the sun gear 19s, so that the rotations of the carrier and the sun gear are synthesized and transmitted through the ring gear 19r to the output gear 21. Since, at this time, the output gear 21 is connected to the ring gear 19r or a rotary element other than the reaction supporting element, the planetary gear 19 establishes a torque circulation. The sun gear 19s and the carrier 19c rotate in the same direction. The output shaft 5 rotates in forward (Low) and backward (Rev) directions across the zero rotation. In the belt type continuously variable transmission 11, more specifically, on the basis of that torque circulation, the torque is transmitted, during the forward rotations, from the secondary pulley 9 to the primary pulley 7 and, during the backward rotations, from the primary pulley 7 to the secondary pulley 9.

In a high mode with the low clutch $C_L$ being released but the high clutch $C_H$ being applied, the transmission through the constant speed transmission 16 to the planetary gear 19 is disconnected so that the planetary gear 19 is brought into an integrally rotating state by the applied high clutch $C_H$. As a result, the rotations of the input shaft 3 are transmitted exclusively through the belt type continuously variable transmission 11 and the high clutch $C_H$ to the output gear 21. The CVT 11 transmits the power from the primary pulley 7 to the secondary pulley 9. The rotations of the output gear 21 are transmitted through the gears 23a and 23b of the counter shaft 6 to the differential unit 25, and further through the left and right axles 5a and 5b to the left and right front wheels.

Figure 4:
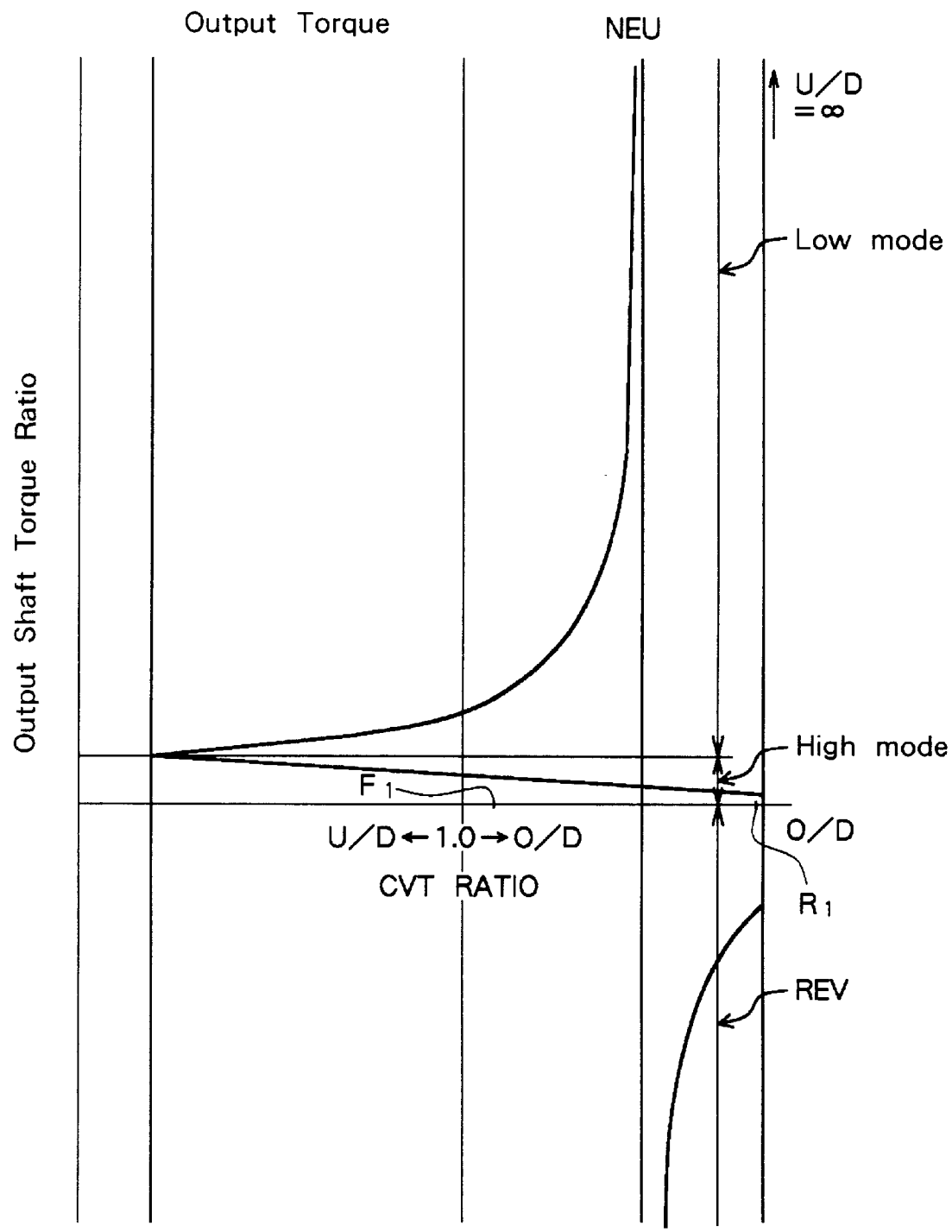
FIG. 4 is a diagram illustrating a change in output torque with respect to torque ratio of a belt type continuously variable transmission (CVT)
Figure 5:
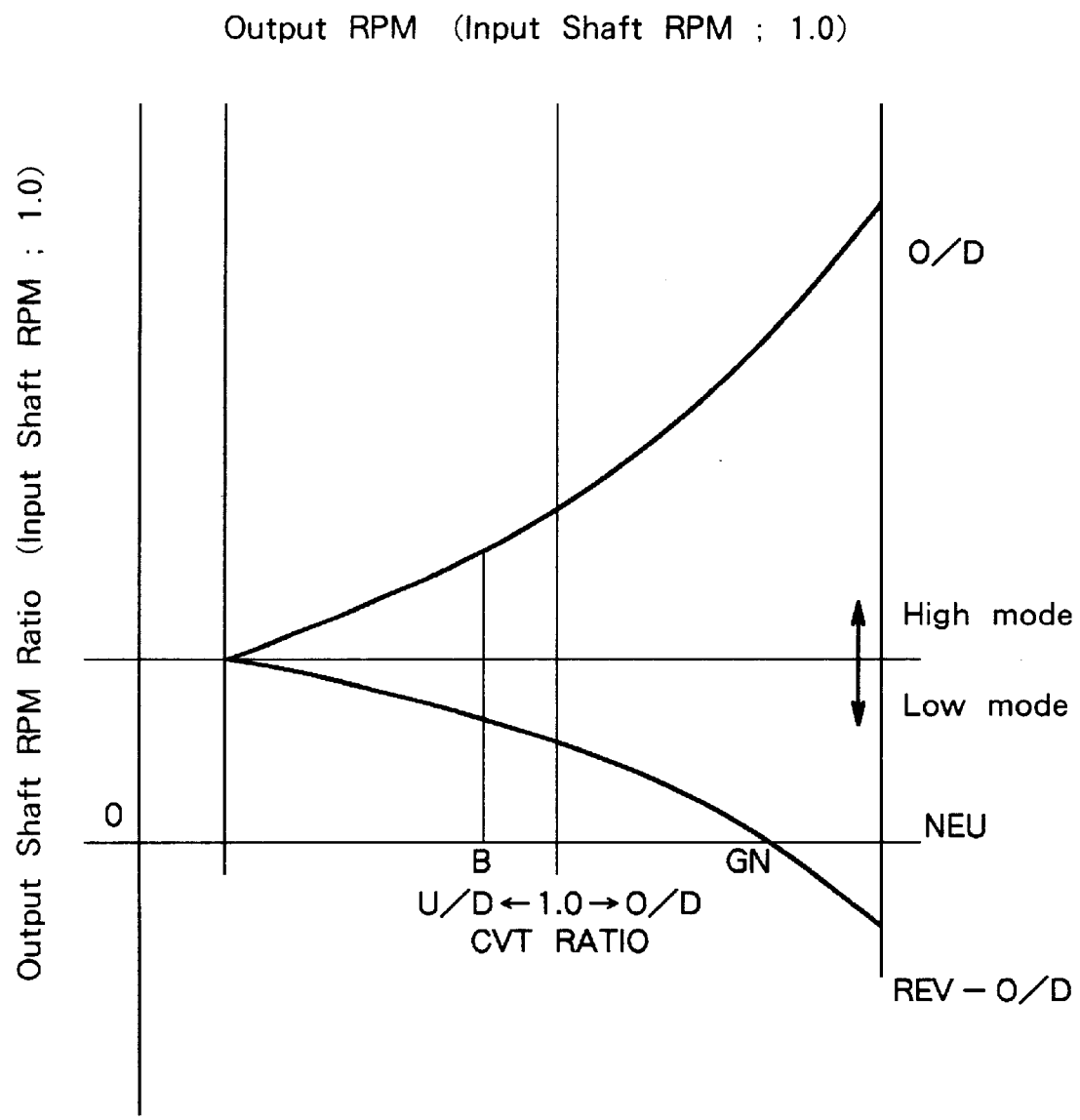
FIG. 5 is a diagram illustrating a change in the output RPM with respect to the torque ratio of the CVT.

As illustrated in the velocity diagram of FIG. 2, in the output torque diagram of FIG. 4 and in the output RPM diagram of FIG. 5, in the low mode, the sun gear 19s rotates at the maximum when the belt type continuously variable transmission (as will be shortly referred to as the "CVT") 11 is at the limit (or the O/D end) in the acceleration direction. On the basis of this, the ring gear 19r is rotated backward of the rotations of the carrier 19c at a constant RPM, to transmit the backward rotation (REV) to the output gear 21. When the CVT 11 is shifted in the decelerating (U/D) direction, the RPM of the backward rotation is decreased to establish a neutral position (NEU), in which the RPM of the output gear 21 takes the value of zero, at a predetermined pulley ratio which is determined by the gear ratio between the planetary gear 19 and the constant speed transmission unit 16. When the CVT 11 is shifted in the decelerating direction (U/D), the ring gear 19r is switched in the forward direction so that the forward rotation is transmitted to the output gear 21. At this time, the torque of the output gear 21 is diverged to infinity in the vicinity of the neutral position NEU, shown in FIG. 4.

When the CVT 11 then reaches the end of the decelerating direction (U/D), the high clutch $C_H$ is applied to switch the high mode. In this high mode, the output rotation of the CVT 11 is transmitted as it is to the output gear 21 so that it becomes a parallel line, as indicated by b in the velocity curve of FIG. 2. As the CVT 11 is then shifted in the accelerating (O/D) direction, the rotation of the output gear 21 is changed into the accelerating direction so that the transmission torque is reduced accordingly. Incidentally, letter appearing in FIG. 2 designates a ratio (Zs/Zr) between the tooth number Zs of the sun gear and the tooth number Zr of the ring gear.

In a parking range P and in a neutral range N, as tabulated in FIG. 3, both the low clutch $C_L$ and the high clutch $C_H$ are released to cut the power of the engine. In the parking range P, the differential unit 25 is locked to lock the axles 5a and 5b.

A hydraulic control mechanism according to the embodiment of the invention will be described with reference to FIG. 6. The hydraulic control mechanism 70 is equipped with a primary regulator valve 71, a ratio control valve 72, a downshift relief valve 73, a manual valve 75, a low-high control valve 76, a low a clutch relief valve 77 and a clutch modulation valve 79, and further with a ratio sensing valve 80 as regulation means, a sensor shoe 81 as pulley ratio detecting means, and an interlock rod 82 as lock means.

The sensor shoe 81 is supported to slide via a guide member 83 which is arranged in parallel with the axis of the primary pulley 7. From the sensor shoe 81, there are protruded two joints 81b and 81c, of which one joint 81b engages the movable sheave 7b of the primary pulley 7 and the other joint 81c engages the ratio sensing valve 80. As a result, when the movable sheave 7b moves along the axis in the O/D direction or in the U/D direction, its movement is transmitted as it is through the sensor shoe 81 to the ratio sensing valve 80.

In the sensor shoe 81, there is formed a recess 81a, with which a root portion 82a of the interlock rod 82 is brought into and out of engagement. This interlock rod 82 is arranged to extend through the valve body to bring its tip portion 82b into and out of engagement with recesses 76a and 76b of the low-high control valve 76. FIG. 6 shows the root portion 82a and the tip portion 82b of the interlock rod 82 as being separated, but they are actually formed integral. Moreover, when the root portion 82a of the interlock rod 82 is in engagement with the recess 81a of the sensor shoe 81, the tip portion 82b does not engage either of the recesses 76a and 76b of the low-high control valve 76, and instead abuts against the surface of the low-high control valve 76. When the root portion 82a is out of engagement with the recess 81a of the sensor shoe 81, but instead abuts against the surface of the sensor shoe 81, the tip portion 82b does not engage either of the recess 76a or 76b of the low-high control valve 76.

In the neutral state, the hydraulic control mechanism 70 of this structure feeds the oil pressure to the two first oil pressure chambers 55 and 56 at the primary and secondary sides and releases the oil pressure from the two second oil pressure chambers 59 and 57. At a forward starting time from the neutral position, the hydraulic control mechanism 70 shifts the CVT 11 in the U/D direction by feeding the oil pressure to the second oil pressure chamber 59 at the secondary side. At a backward starting time, the hydraulic control mechanism 70 shifts the CVT in the O/D direction by feeding the oil pressure to the second oil pressure chamber 57 at the primary side. At this time, a malfunction of the computer may switch the low-high control valve 76 to effect a start backward in the D-range, for example. In order to reliably prevent this backward start, in a predetermined forward range of the CVT, the downshift is inhibited by the ratio sensing valve 80, and the switching of the low-high control valve 76 is mechanically regulated by the interlock rod 82. Across a predetermined pulley ratio B (e.g., 1.3) slightly larger than 1.0 of the forward range illustrated in FIG. 5, more specifically, the control is changed between a region (at the U/D side) having a larger pulley ratio and a region (at the O/D side) having a smaller pulley ratio. By this change in the control, in the region having a pulley ratio no less than the predetermined value B, the downshifts in the low mode of the D-range and in the R-range are inhibited, and the jumps from the H-mode of the D-range to the L-mode of the D-range and to the R-range are inhibited.

Figure 6:
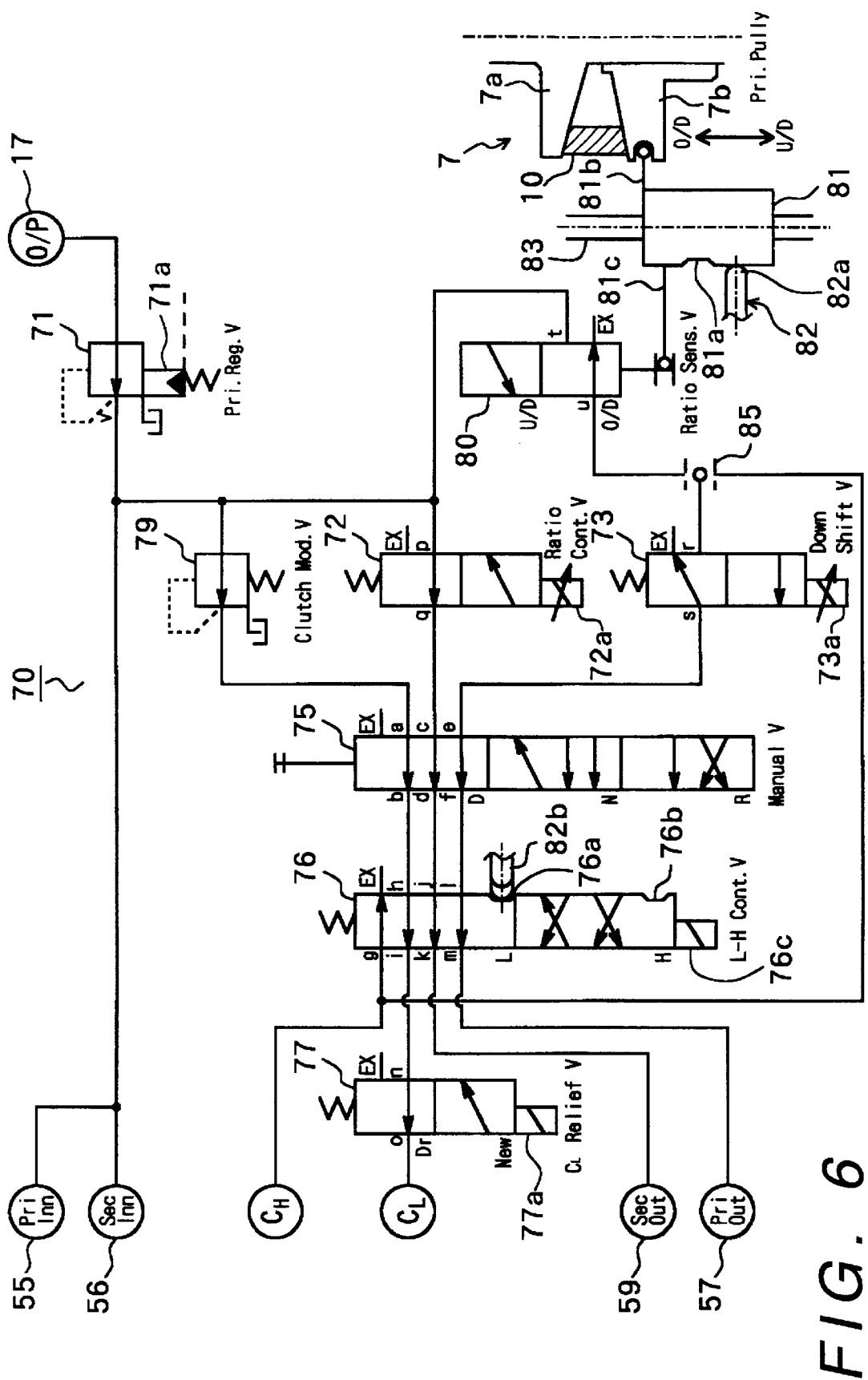
FIG. 6 is a diagram showing a hydraulic control mechanism which can be applied to the infinitely variable transmission according to the invention.

FIG. 6 shows the operations of the hydraulic control mechanism 70 having this structure. In the following, the description will be made sequentially in the order of (1) the low mode of the D-range, (2) the high mode of the D-range, (3) the R (reverse) range, and (4) the N (neutral) and P (parking) ranges. In any of the modes (1) to (4), the oil pressure from the oil pump 17 is properly regulated by the primary regulator valve 71, as shown in FIG. 6, so that it is outputted from an output port v. This output oil pressure is fed to the first oil pressure chambers 55 and 56 of the primary and secondary side hydraulic servos 7c and 9c so that the two oil pressures are equalized, until the equal oil pressures are fed to the clutch modulation valve 79. This output oil pressure of the clutch modulation valve 79 is selectively fed to the low clutch $C_L$ or the high clutch $C_H$ in the modes other than (4) the N-range and P-range.

(1) D-range—Low Mode

The equal oil pressures are fed to the first oil pressure chambers 55 and 56 to apply the low clutch $C_L$. In the upshift, moreover, the oil pressure is applied to the second oil pressure chamber 59 at the secondary side. In the downshift, the oil pressure is applied to the second oil pressure chamber 57 at the primary side only when over the pulley ratio B. In the upshift, more specifically, the manual valve 75 is operated to the D-range position to provide communication between ports a and b, ports c and d, and ports e and f, and the low-high control valve 76 is set in the low-mode position to provide communication between ports h and i, ports j and k, and ports l and m and to switch/retain a port g into/in communication with a drain port Ex.

The low clutch $C_L$ is fed at its hydraulic servo with the oil pressure from the clutch modulation valve 79 through ports a and b of the manual valve 75, ports h and i of the low-high control valve 76 and ports n and o of the low clutch relief valve 77 so that it is applied. The oil pressure from the output port v of the primary regulator valve 71 is gradually raised to a level corresponding to the target pulley ratio by the ratio control valve 72 and is fed to the secondary side second oil pressure chamber 59 through ports p and q, ports c and d of the manual valve 75 and ports j and k of the low-high control valve 76. In this state, the high clutch $C_H$ is released by communication from port g of the low-high control valve 76 to the drain port EX, and the second oil pressure chamber 57 at the primary side communicates with the drain port EX through ports m and l of the low-high control valve 76, ports f and e of the manual valve 75 and port s of the downshift relief valve 73. Here, while the CVT 11 is confined within the range not exceeding the pulley ratio B by the upshift, the low-high control clutch 76 is mechanically regulated from being switched by the interlock rod 82.

As a result, the low clutch $C_L$ is applied. In the CVT 11, the axial force by the secondary side hydraulic servo 9c, in which the oil pressure is applied to both the first and second oil pressure chambers 56 and 59, exceeds the axial force by the primary side hydraulic servo 7c, in which the oil pressure is applied only to the first oil pressure chamber 55, and is gradually raised to increase the pulley ratio. At this time, the movable sheave 7b of the primary pulley 7 is moved to the U/D side. In this state, the engine torque, as transmitted from the input shaft 3 through the low clutch $C_L$ and the constant speed transmission unit 16 to the carrier 19c of the planetary gear 19, is extracted, while being regulated through the sun gear 19s by the CVT 11 at the predetermined pulley ratio, out of the output gear 21 through the ring gear 19r.

For the downshift in low mode of the D-range, in the region below the predetermined pulley ratio B, the ratio sensing valve 80 is set in the state shown in FIG. 6 through the sensor shoe 81, and the oil pressure from the output port v of the primary regulator valve 79 is cut by the ratio sensing valve 80 so that the feed of the oil pressure to the primary side second oil pressure chamber 57 necessary for the downshift is disabled. In this case, too, the oil pressure in the secondary side second oil pressure chamber 59 can be drained by making the port q of the ratio control valve 72 communicate with the drain port Ex, thereby effecting the downshift to the neutral state. In the region over the predetermined pulley ratio B, the downshift can be effected by the ratio sensing valve 80 and so on. Over the predetermined pulley ratio B, more specifically, the movable pulley 7b of the primary pulley 7 is moved to the U/D side so that the ratio sensing valve 80 is moved downward of the Figure through the sensor shoe 81. The oil pressure from the primary regulator valve 71 is introduced, as the communication between ports t and u of the ratio sensing valve 80 is established, into the downshift relief valve 73 through a check valve 85. By moving the downshift relief valve 73 upward of the Figure to provide the communication between ports r and s, therefore, the feed of the oil pressure to the primary side second oil pressure chamber 57 is enabled through ports e and f of the manual valve 75 and ports l and m of the low-high control valve 76.

(2) D-Range—High Mode

The equal oil pressures are fed to the two first oil pressure chambers 55 and 56 at the primary and secondary sides to apply the high clutch $C_H$. In the upshift, moreover, the oil pressure is fed to the primary side second oil pressure chamber 57. In the downshift, the oil pressure is fed to the secondary side second oil pressure chamber 59. In the upshift in the D-range—high mode, more specifically, the manual valve 75 is in the same D-range position as that in the preceding low mode, but the low-high control valve 76 is switched to the high-mode position to provide communication between ports h and g, ports j and m, and ports l and k and the communication of port i with the drain port Ex.

The output oil pressure from the output port v of the primary regulator valve 71 is fed through ports a and b of the manual valve 75 and ports h and g of the low-high control valve 76 to apply the clutch $C_H$, and is fed through ports p and q of the ratio control valve 72, ports c and d of the manual valve 75 and ports j and m of the low-high control valve 76 to the primary side second oil pressure chamber 57. The low clutch hydraulic servo $C_L$ is released by the communication from port i of the low-high control valve 76 to the drain port Ex, and the secondary side second oil pressure chamber 59 is opened to communicate with the drain port Ex through ports k and l of the low-high control valve 76, ports f and e of the manual valve 75 and port s of the downshift relief valve 73.

As a result, the high clutch $C_H$ is applied. In the CVT 11, the axial force by the primary side hydraulic servo 7c, in which the oil pressure is applied to the first and second oil pressure chambers 55 and 57, exceeds the axial force by the secondary side hydraulic servo 9c in which the oil pressure is fed only to the first oil pressure chamber 56. In the axial force state corresponding to the torque transmission from the primary pulley 7 to the secondary pulley 9, by regulating the ratio control valve 75 properly, the oil pressure of the second oil pressure chamber 57 of the primary hydraulic servo 7c is regulated to adjust the axial force of the primary pulley 7 so that a proper pulley ratio (or torque ratio) is achieved. In this state, the torque, as transmitted from the engine to the input shaft 3, is properly changed by the CVT 11 transmitted from the primary pulley 7 to the secondary pulley 9 and is extracted from the output gear 21 through the high clutch $C_H$.

In the D-range—high mode, when the CVT 11 is in the region having a smaller (or O/D side) pulley ratio than the value B, the low-high control valve 76 is mechanically inhibited from being switched into the low mode by the interlock rod 82. When the pulley ratio of the CVT is lower than the pulley ratio B, the downshift is not inhibited, as opposed to the case of the D-range—low mode. Even in the D-range—high node, the oil pressure from the output port v of the primary regulator valve 71 is shut off by the ratio sensing valve 80 in the state shown in FIG. 6 so that it is not fed to the secondary side second oil pressure chamber 59 through the downshift relief valve 73, the manual valve 75 and the low-high control valve 76. In place of this, however, the oil pressure from the high clutch $C_H$ is fed to the secondary side second oil pressure chamber 59 through the check valve 85, ports r and s of the downshift relief valve 73, ports e and f of the manual valve 75 and ports l and k of the low-high control valve 76. The downshift can be made in the D-range—high mode all over the region of the pulley ratio.

(3) R-Range

In the R-range, the predetermined oil pressure is fed not only to the first and second oil pressure chambers 55 and 57 of the primary side hydraulic servo 7c but also to the first oil pressure chamber 56 of the secondary side hydraulic servo 9c and to the low clutch hydraulic servo $C_L$. The manual valve 75 is in the R-range position, and the low-high control valve 76 is in the low-mode position. The oil pressure from the output port v of the primary regulator valve 71 is to the low clutch hydraulic servo $C_L$ through ports a and b of the manual valve 75 and ports h and i of the low-high control valve 76 and further to the primary side second oil pressure chamber 57 through ports p and q of the ratio control valve 72, ports c and f of the manual valve 75 and ports l and m of the low-high control valve 76. Port s of the downshift relief valve 73 is opened to communicate with the drain valve Ex.

As a result, the low clutch $C_L$ is applied, and the axial force by the primary side hydraulic servo 7c, in which the oil pressure is applied to the first and second oil pressure chambers 55 and 57, increases above that at the secondary side by the secondary side oil pressure chamber 9c exclusively by the first oil pressure chamber 56, so that it corresponds to the torque transmission from the primary pulley 7 to the secondary pulley 9. By the regulation of the ratio control valve 57, moreover, the oil pressure of the second oil pressure chamber 57 of the primary hydraulic servo 7c is adjusted to establish a proper pulley ratio. In this state, the pulley ratio of the CVT 11 is in the predetermined accelerating (O/D) state, and the engine torque from the input shaft 3 is transmitted through the low clutch $C_L$ and the constant speed transmission unit 16 to the carrier 19c of the planetary gear 19 and further through the CVT 11, in which the torque is transmitted from the primary pulley 7 to the secondary pulley 9, to the sun gear 19s. These two torques are synthesized in the planetary gear 19 until they are extracted as reverse rotations through the ring gear 19r out of the output shaft 5. In this R-range, as in the range no more than the predetermined pulley ratio B in the D-range—low mode, the feed of the oil pressure to the downshift relief valve 73 is inhibited by the sensor shoe 81 and the ratio sensing valve 80 so that the downshift is inhibited. In the R-range, intrinsically, the engine braking is not especially required so that no problem arises even when the downshift is inhibited.

(4) N-Range and P-Range

Both the low clutch $C_L$ and the high clutch $C_H$ are released. The predetermined oil pressure is applied to the first oil pressure chambers 55 and 56 of the two hydraulic servos 7c and 9c at the primary and secondary sides. The manual valve 75 is opened at ports c and d and ports e and f and at port b to communicate with the drain port Ex. The low-high control valve 76 is retained at the low-mode position. The ratio control valve 72 is opened at port q to communicate with the drain port Ex, and the ratio sensing valve 80 is retained at the position shown in FIG. 6. In both the primary hydraulic servo 7c and the secondary hydraulic servo 9c, therefore, the same oil pressure is applied only to the first oil pressure chambers 55 and 56 so that substantially equal axial forces are applied to both the primary and secondary pulleys 7 and 9.

The control of the infinitely variable transmission according to the embodiment of the invention is described below.

Figure 7:
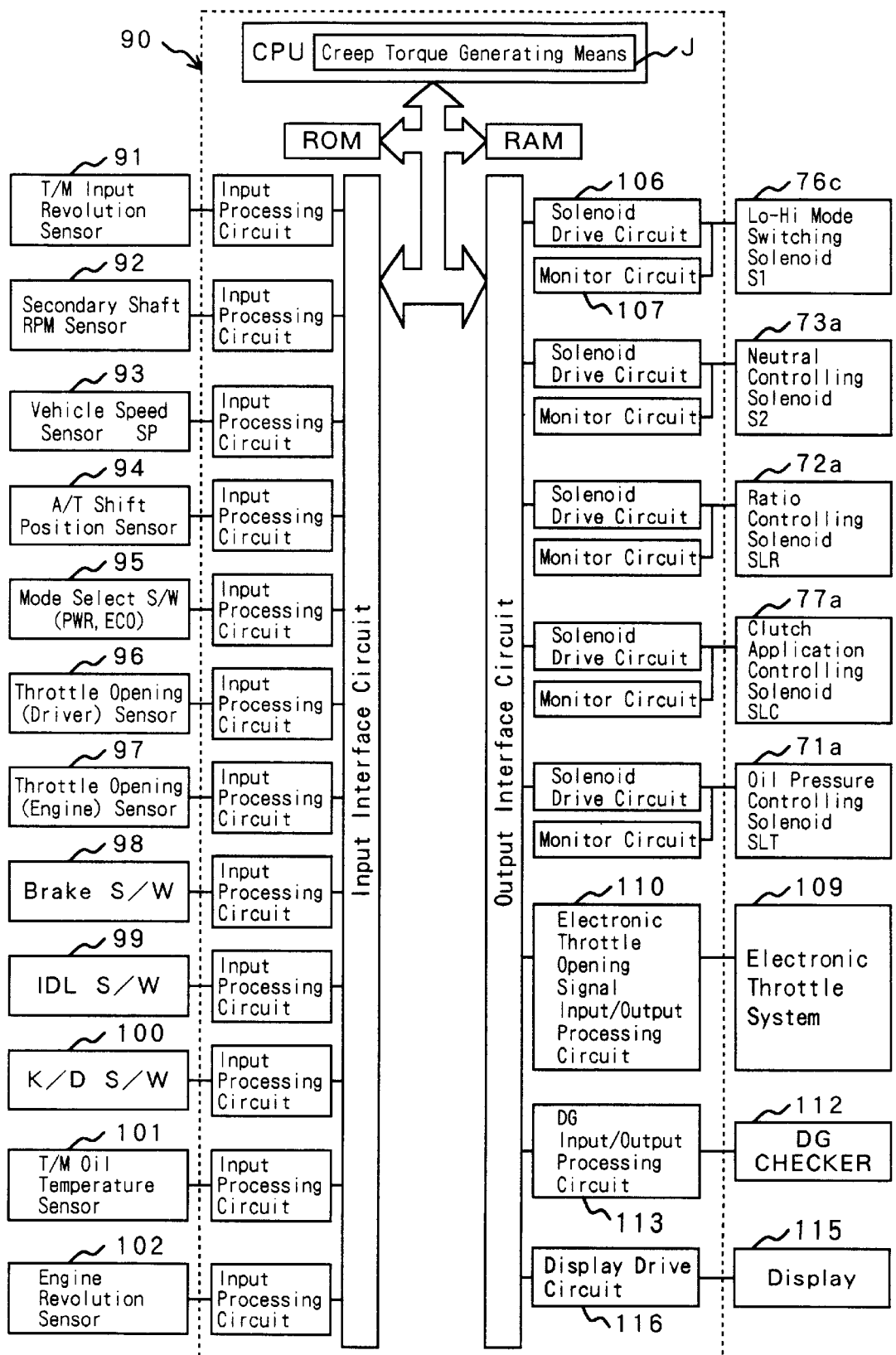
FIG. 7 is a block diagram showing an electric control mechanism of the hydraulic control mechanism.

FIG. 7 is a block diagram of an electronic control unit (ECU) 90. Reference numeral 91 designates a sensor mounted in the infinitely variable transmission 1 for detecting the RPM of the input shaft 2 of the transmission; numeral 92 a sensor for detecting the RPM of the secondary pulley 9 of the CVT 11; numeral 93 a vehicle speed sensor for detecting the RPM of the output shaft 5 of the infinitely variable transmission; numeral 94 a sensor for detecting which of the shift positions P, R, N and D the shift lever of the infinitely variable transmission, i.e., the manual valve takes; numeral 95 a mode select switch for selecting either a power mode based on the maximum power characteristic or an economy mode based on the best mileage characteristic; numeral 96 a sensor for detecting the throttle opening based on an accelerator (or throttle) pedal; numeral 97 a sensor made of a potentiometer, as mounted on the engine, for detecting the actual degree of throttle opening; numeral 98 a switch for detecting that a brake pedal is at the depressed position; numeral 99 a sensor for detecting that the accelerator pedal is released so that the throttle is idle; numeral 100 a kickdown switch for detecting the state in which the accelerator pedal is fully depressed; numeral 101 a sensor for the oil temperature of the transmission; and numeral 102 a sensor for detecting the engine RPM.

Signals from the individual sensors are received by a CPU, a ROM or a RAM through individual input processing circuits and an input interface circuit. Moreover, a control unit, including the CPU and so on, is equipped with later-described creep torque generating means J.

At the output side, reference numeral 76c designates a solenoid to be turned ON/OFF for the low-high control valve 76 to switch the low mode and the high mode. Numeral designates 73a designates a solenoid for the downshift relief valve 73 to drain the higher pressure side circuit. The solenoid 73a is activated at the engine braking time or the later-described neutral (N) control time and is made of a duty or linear solenoid. Numeral 72a designates a solenoid for controlling the ratio control valve 72 to regulate the shift controlling oil pressure. The solenoid 72a is made of a duty or linear solenoid. Numeral 77a designates a solenoid valve made of a duty solenoid for the low clutch relief valve 77. Numeral 71a designates a solenoid made of a linear solenoid for the primary regulator valve 71 to control the line pressure. The individual solenoids are driven on the basis of the signals from the output interface circuit through solenoid drive circuits 106 for generating predetermined voltages or outputs, and their individual actions are monitored by monitor circuits 107 such that their failures are determined.

Numeral 109 designates an electronic throttle system unit for controlling the engine, and numeral 110 designates a circuit for outputting a drive signal of an electronic throttle stepping motor and for inputting feedback data and a processing circuit for inputting the engine RPM. Numeral 112 designates a checker member for outputting a self-diagnosis result when the electronic control unit 90 fails, and numeral 113 designates a circuit for outputting the self-diagnosis result at the failure. Numeral 115 designates a display unit such as a power mode or economy mode display lamp for displaying the state of the infinitely variable transmission, and numeral 116 is a drive circuit for the display.

The infinitely variable transmission 1 is connected directly to the input shaft 3 from the engine output shaft 2 only through the damper unit 12 and is not required to have the starter unit, as needed with conventional devices, such as a torque converter, a fluid coupling, an electromagnetic clutch or an input clutch. In the D (drive) range, therefore, at the stopping time of the vehicle, the N (neutral) control is required in which the infinitely variable transmission 1 is automatically brought into the neutral state.

The N-control is made to substantially equalize the axial forces of the primary pulley 7 and the secondary pulley 9. Alternatively, the difference between at least the primary and secondary pulleys is controlled either to such a value smaller than the axial force difference, which is determined by the input torque and the pulley ratio of the CVT at the instant of the positive output torque direction, of the two pulleys while the difference does not become negative, or to such a value smaller than the axial force difference, which is determined by the input torque and the pulley ratio of the CVT at the instant of the negative output torque direction, of the two pulleys while the difference does not become negative. With the two first oil pressure chambers 55 and 56 of the two primary and secondary hydraulic actuators 7c and 9c being fed with the oil pressures, the oil pressures in the two second oil pressure chambers 57 and 59 are released to equalize the axial forces of the two pulleys 7 and 9.

Here, the N-control is disclosed in detail in Japanese Patent Application Nos. 7-66234 and 7-128701.

According to the disclosure of the above-specified Patent Applications, by repeating such shifts in accordance with the vehicle speed that the CVT is shifted in the U/D (decelerating) direction depending upon the negative torque state at the coasting time and that the CVT is shifted in the O/D (accelerating) direction in the positive torque state when the engine RPM becomes lower than the idle value, the CVT 11 converges by itself to the gear neutral (GN) point in which the vehicle is stably held in the vehicle stopping state. By substantially equalizing the two axial forces of the primary pulley and the secondary pulley (within the predetermined range) on the basis of the axial force difference in the positive and negative torque states, the CVT 11 is stably held at the GN point. However, the self-convergence to the GN point at the N-control time is slowed depending upon the switching of the negative torque and positive torque. In the embodiment of the invention, therefore, the engine torque is controlled in the N-control so as to establish the positive torque at all times.

The principle of self-convergence at the N-control type, as based on the input (engine) torque control is described below. A formula expressing the axial force of a V-belt is exemplified by OGASAWARA's Formula, as expressed by the following Formula 1:

Formula 1

$$F_{DV} = \frac{\phi 1}{\phi 2} \cdot F_{DN} + \frac{\phi 1 \cdot Tin}{2 \cdot r1 \cdot \tan(\theta + \rho n)} \cdot \left[1 - \frac{1}{2} \cdot \left\{\frac{\tanh(\lambda \cdot r1 \cdot \phi 1)}{\lambda \cdot r1 \cdot \phi 1} + \right.\right.$$

-continued
$$\left.\left. \frac{\tanh(\lambda \cdot r2 \cdot \phi 2)}{\lambda \cdot r2 \cdot \phi 2}\right\}\right]$$

[Formula 1]

Here, $F_{DV}$ indicates the axial force of the drive side pulley (or the secondary pulley); $F_{DN}$ the axial force of the driven side pulley (or the primary pulley); $f_1$ the belt contact angle of the drive side pulley; $f_2$ the belt contact angle of the driven pulley; $r_1$ the effective radius of the drive side pulley; $r_2$ the effective radius of the driven side pulley; and $T_{in}$ the input (engine) torque.

The Formula 1 is simplified into Formula 2.

Formula 2

$$F_{DV} = \frac{\phi 1}{\phi 2} \cdot F_{DN} + Tin \cdot f(Ip)$$

[Formula 2]

Here, $f(I_p)$ indicates a function varying with the pulley ratio ($r_2/r_1$).

The drive side axial force $F_{DV}$ to balance the driven side axial force $F_{DN}$ requires the higher force as the input torque $T_{in}$ becomes higher. Here, the relationship between the axial forces is expressed by Formula 3 if the two axial forces are substantially equalized by the N-control.

Formula 3

$F_{DV}$ (at the execution value) ≈ [Formula 3]

$$F_{DN} < \frac{\phi 1}{\phi 2} \cdot F_{DN} + Tin \cdot f(Ip) = F_{DV} \text{(at the balance value)}$$

Here, if the control is made so that the balance value (or theoretical value) in Formula 3 may be $F_{DV} \approx F_{DN}$ for $f_1 < f_2$, the axial force of the drive side (or secondary) pulley becomes excessive so that this axial force difference $\Delta F_{DV}$ converges by closing the drive side pulley to bring the CVT into the O/D direction. Specifically, the convergence is made to the GN point for the difference $\Delta F_{DV}$ between the execution value and the balance value (or theoretical value) of the axial force [$\Delta F_{DV} = F_{DV}$(at the execution value)$-F_{DV}$(at the balance value)]. This load difference ($\Delta F_{DV}$) becomes larger, as apparent from Formula 3, as the input torque ($T_{in}$) becomes higher.

Specifically, it is apparent that the converging force to the GN point increases if the input torque increases at the individual pulley ratios, as based on OGASAWARA's Formula 1 described above, and that the converging rate rises with the increase in the converging force.

Figure 8:
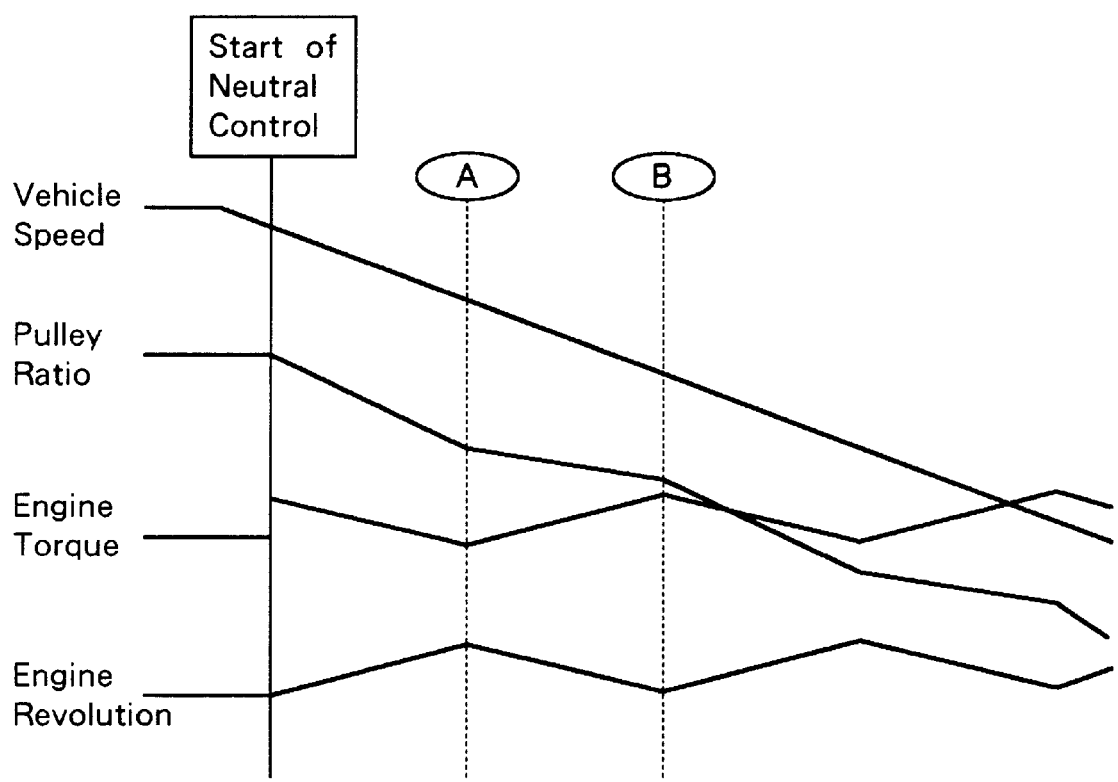
FIG. 8 is a diagram showing a converging mechanism to a GN point at an N-control time by an input torque control.

FIG. 8 shows the converging mechanism of the N-control by controlling the input (engine) torque. The N-control is started when the vehicle speed becomes lower than a predetermined value while the vehicle is in the decelerating (coasting) state with the accelerator pedal being released and further with the brake pedal being depressed. By the N-control, the engine output torque is raised so that the pulley ratio of the CVT self-converges at a high rate toward the GN point, as described above. As a result, the engine RPM rises so that the engine torque gradually lowers (Start point: A).

As the engine torque lowers, the converging rate is delayed to suppress the rise in the engine RPM. Since the deceleration of the vehicle continues, the engine RPM drops (A→B) when the convergence of the CVT cannot follow the deceleration of the vehicle. When the engine RPM drops, the engine torque rises so that the converging rate can be raised again to follow the deceleration of the vehicle (B and later). Subsequently, these operations are repeated so that the pulley ratio of the CVT converges at the GN point, until the vehicle is stopped.

Figure 9:
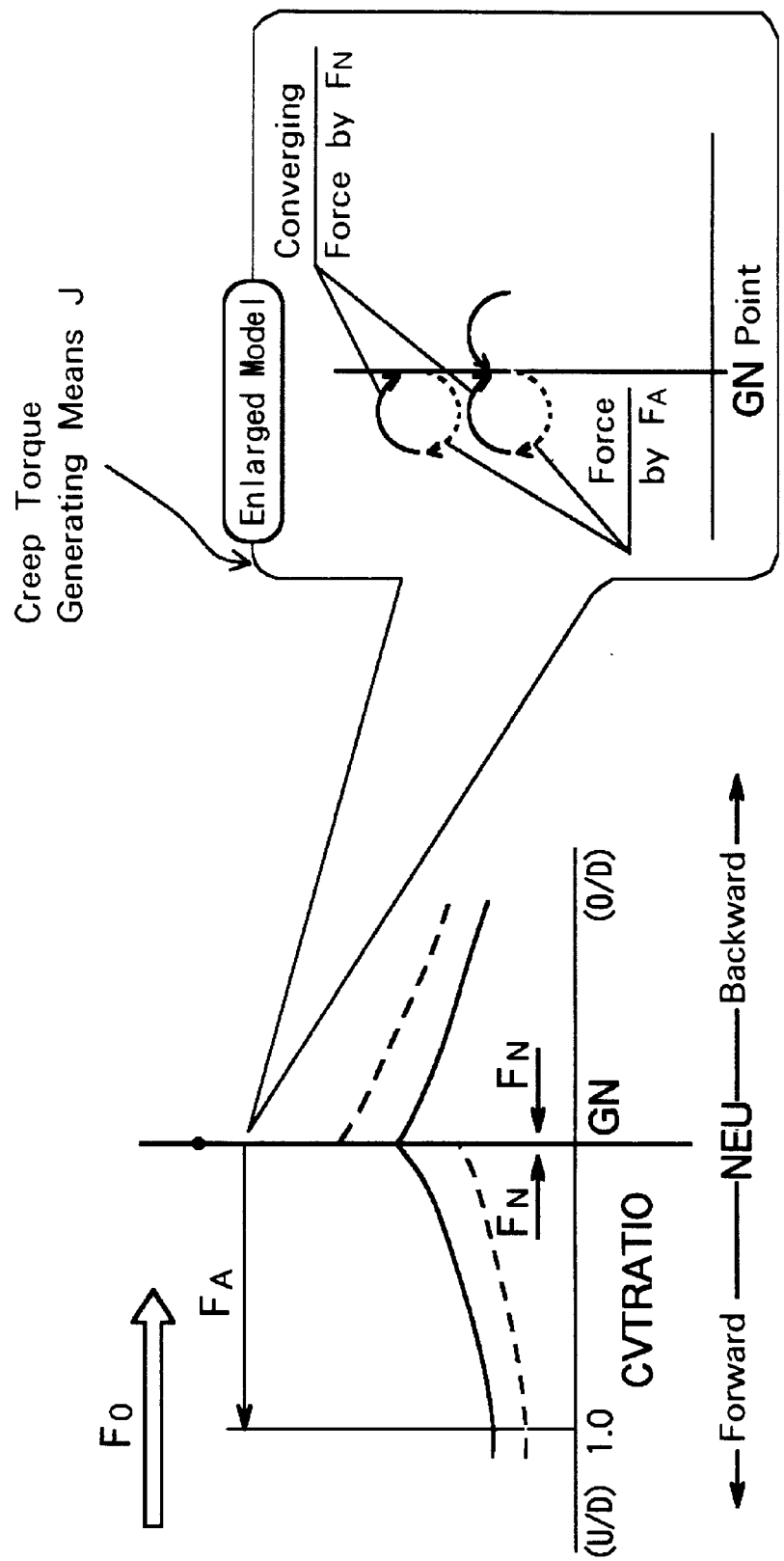
FIG. 9 is a diagram showing a mechanism for generating a creep torque.

FIG. 9 shows the creep torque of the infinitely variable transmission (IVT) 1 which takes the neutral state at the GN point of the CVT. In the automatic transmission (A/T) of the conventional devices that have a multistage speed change mechanism such as a planetary gear, there is interposed between the engine output shaft and the input shaft of the multistage speed change mechanism a torque converter (or a starter unit) for applying a torque (i.e., the stalling torque) increasing with the engine RPM to the input shaft of the multistage speed change mechanism being topped to start the vehicle smoothly. The infinitely variable transmission 1 is automatically held by the N-control in the neutral position, in which it establishes a forward torque (i.e., the creep torque) similar to that of the torque converter.

As described before, there is established a force $F_N$ for causing the CVT to self-converge from the forward or backward region to the GN point (or the first pulley ratio). When this GN point is reached, the CVT moves into a no-load state or a state infinitely close to the no-load. The CVT 11 itself is in the state where the primary and secondary pulleys are balanced by the belt tension, that is, where the pulley ratio is at 1.0, so that a force $F_A$ is established toward the pulley ratio 1.0. As a result, simultaneously as the CVT moves to the GN point so that the infinitely variable transmission (IVT) 1 takes the no-load state, the force $F_A$ is established toward the point of the pulley ratio of 1.0 or the stable converging point of the CVT itself. The force $F_A$ toward the pulley ratio of 1.0 in the no-load state and the force $F_N$ toward the GN point in the load state, as established when the CVT is brought out of the GN point by the force $F_A$, come into the vortex state, as illustrated in an enlarged model, so that the forward creep torque is established. This mechanism forms the creep torque generating means J according to the invention.

When an axial force $F_O$ in the O/D direction is applied to the CVT against the force $F_A$ directed toward the pulley ratio of 1.0 by making an area difference between the first oil pressure chambers 55 and 56 at the primary and secondary sides, the force $F_A$ is eliminated so that the forward creep torque disappears. These axial forces $F_A$ and $F_O$ are not subject to the influences of the input torque or the transmission efficiency so that the axial forces of the primary and secondary pulleys at the N-control time can be biased by a predetermined amount from equal values to establish an arbitrary creep torque.

Figure 10:
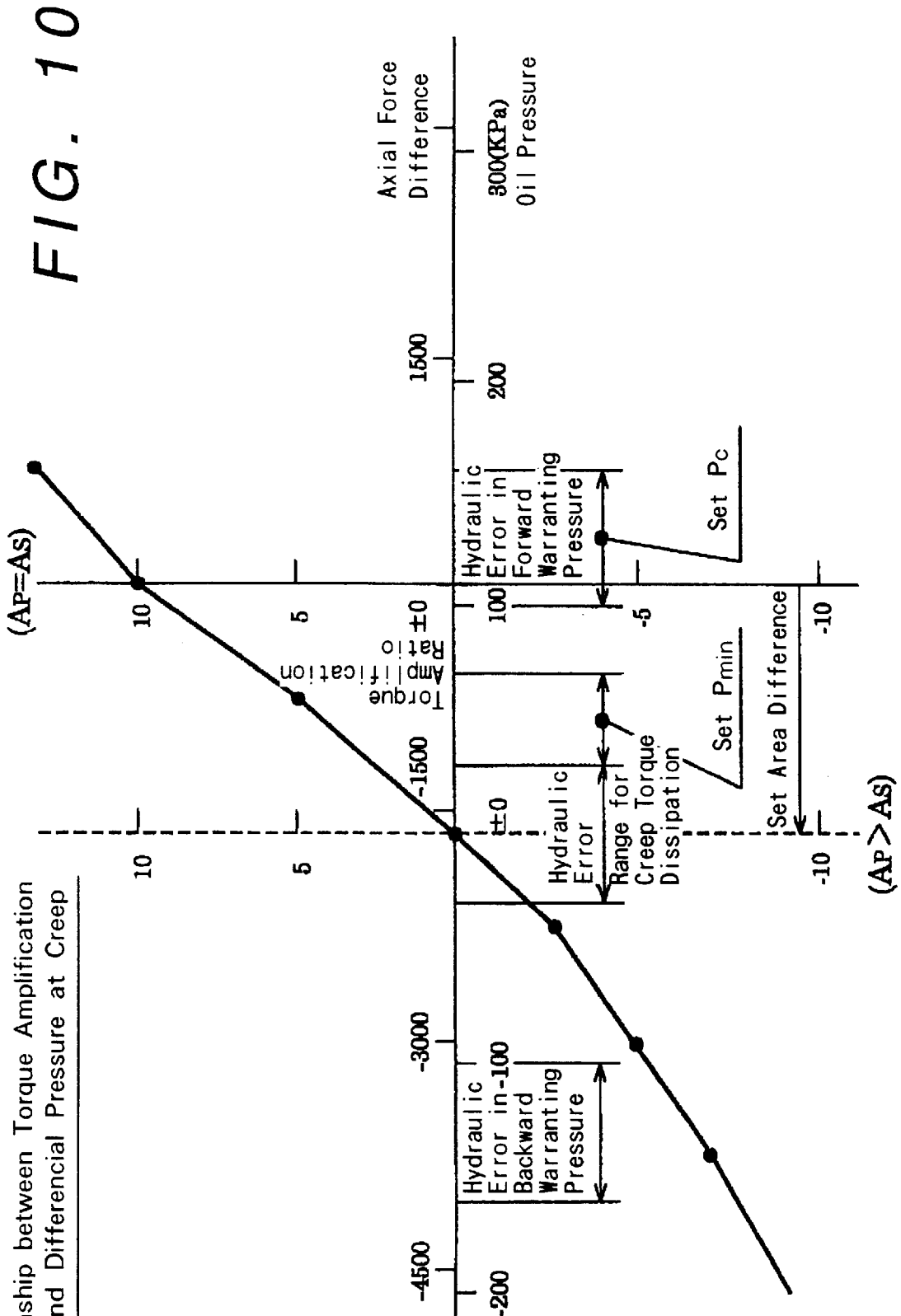
FIG. 10 is a diagram illustrating the relationship between a torque amplification ratio at a creep time and an axial force difference and an oil pressure difference of two pulleys.
Figure 11:
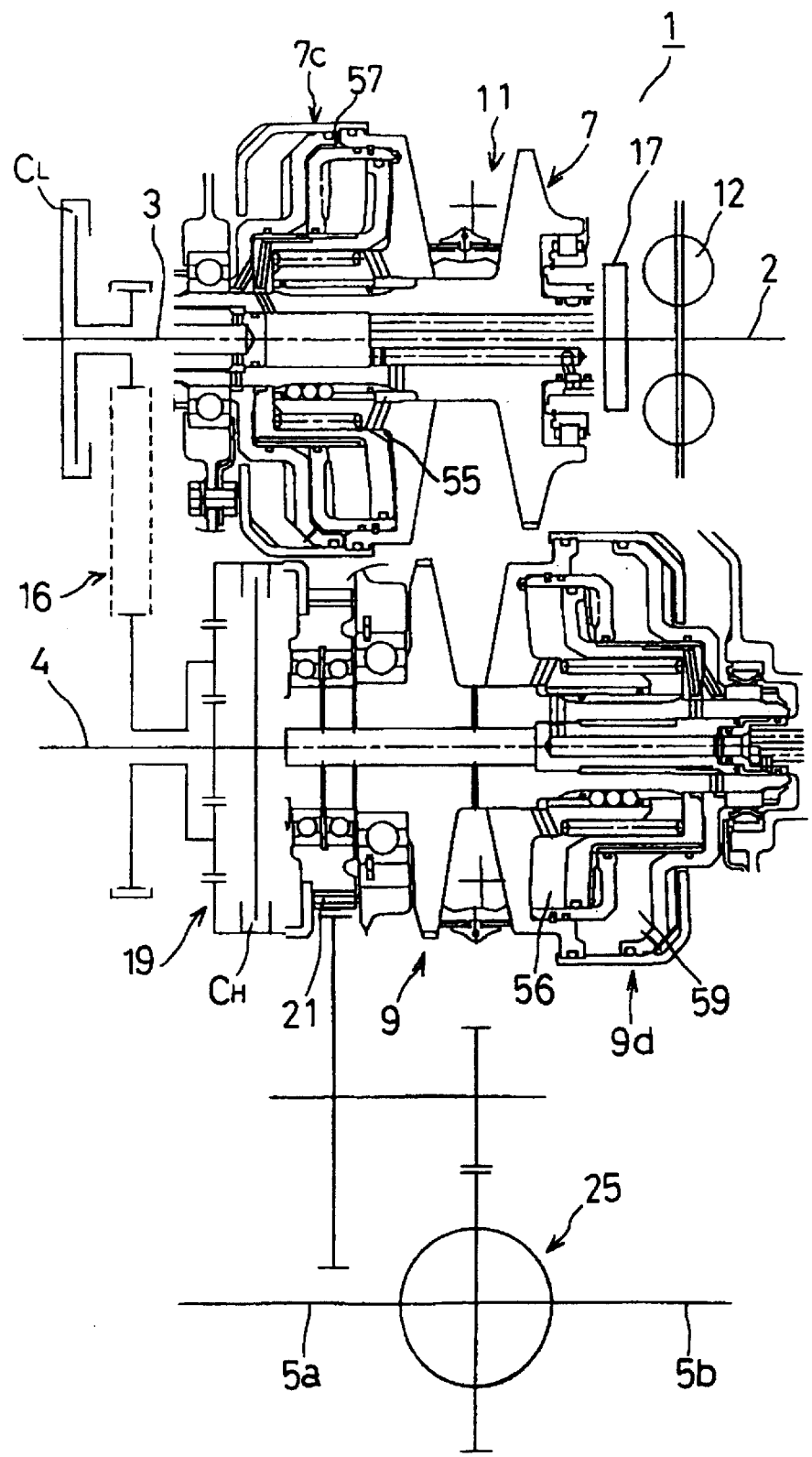
FIG. 11 is a front elevational view showing an infinitely variable transmission having a modified effective pressure receiving area.
Figure 12:
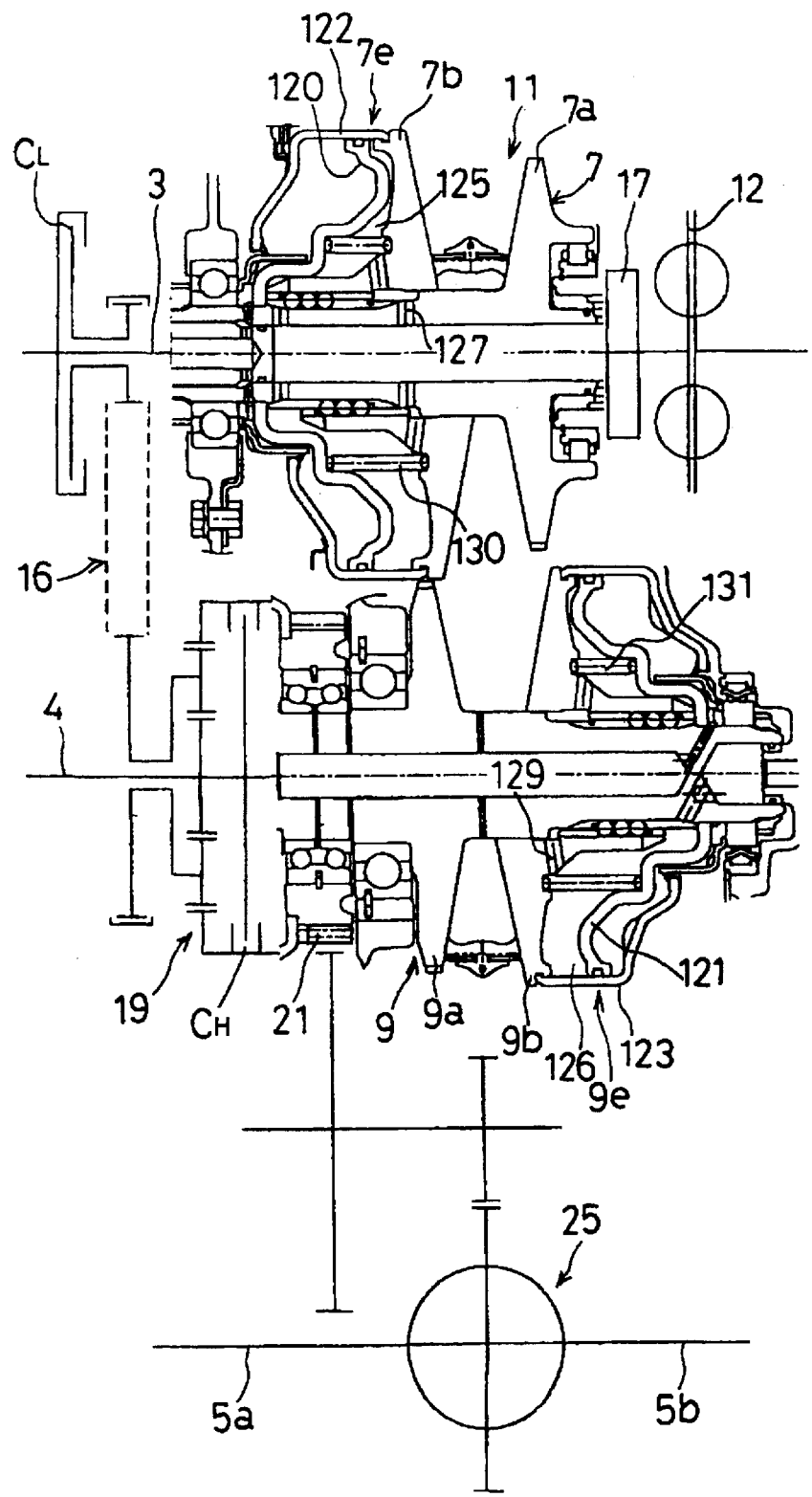
FIG. 12 is a front elevational view showing an infinitely variable transmission according to another embodiment of the invention.

FIG. 10 illustrates a relationship between the axial force difference (at the upper stage) and the applied oil pressure difference (at the lower stage) of the primary and secondary pulleys and the creep torque. The upper stage of the abscissa indicates the axial force difference of the secondary pulley from the primary pulley. On the ordinate, the upper portion indicates the torque amplification ratio in the forward direction, and the lower portion indicates the torque amplification ratio in the backward direction. When the effective pressure receiving areas of the first oil pressure chambers 55 and 56 in both the primary and secondary pulleys 7 and 9 are equal ($A_p=A_s$), as shown in FIG. 1, the axial force difference between the two pulleys takes the value 0 so that the creep torque at a predetermined torque amplification ratio is generated in the forward direction. The lower stage of the abscissa indicates the difference of the oil pressure, as applied to the secondary side hydraulic actuator, from the oil pressure applied to the primary side hydraulic actuator in the infinitely variable transmission in which a difference is made ($A_p>A_s$) between the effective pressure receiving areas of the primary and secondary sides hydraulic actuators, as shown in FIGS. 11 and 12, so that the creep torque may take a value of substantially 0 when equal oil pressures are applied to both the hydraulic actuators. In this structure, when the infinitely variable transmission 1 is warranted to take the forward state and when the forward creep torque is set by the torque approximating that of the torque converter of the conventional devices, a higher differential pressure $P_C$ than that of the primary side is fed to the oil pressure chambers at the secondary side. Within the range warranting the forward direction, the predetermined forward creep torque is generated even at the N-control time so that a forward creep is established if the brake is released.

When the area difference between the oil pressure chambers of the two pulleys is made ($A_p>A_s$) to set $F_A=F_O$, the creep torque takes the value 0. In the actual control, however, an error exists in the oil pressure to be set, and the torque may be established in the backward direction within the error range if the driver is conscious of the forward state. By feeding a slight differential pressure to the secondary side, therefore, a range $P_{min}$ is set at the forward side in the range (less than the torque necessary for moving the vehicle) in which the vehicle does not actually move forward. In this range $P_{min}$, the vehicle is kept in the stopped state in the N-control even if the brake pedal is released.

When an oil pressure higher than that of the secondary side is fed to the oil pressure chamber of the primary pulley, the range of the oil pressure error warrants that the infinitely variable transmission takes the backward state. In this range of the oil pressure warranting the backward direction, the backward creep torque is established even in the N-control state so that the vehicle creeps backward if the brake pedal is released.

FIG. 11 shows an embodiment of the invention in which the creep torque is reduced substantially to 0 when equal oil pressures are applied to the first oil pressure chambers in the two pulleys at the primary and secondary sides. In FIG. 11, the hydraulic actuator 7c at the primary pulley side is similar to that of FIG. 1, but a hydraulic actuator 9d at the secondary pulley side is slightly different. The effective pressure receiving area of the second oil pressure chamber 59 of the hydraulic actuator 9d at the secondary pulley side is equal to that of the second oil pressure chamber 57 at the primary side. But the effective pressure receiving area ($A_s$) of the first oil pressure chamber 56 is set to be smaller by a predetermined value than the area ($A_p$) of the first oil pressure chamber 55 at the primary side ($A_p>A_s$). In the N-control, the oil pressures of the two second oil pressure chambers 57 and 59 at the primary and secondary sides are released and the equal predetermined oil pressures are fed to the two first oil pressure chambers 55 and 56. An axial force $F_S$ of the secondary pulley 9 becomes smaller by a predetermined value than an axial force $F_p$ of the primary pulley 7. This difference ($F_P-F_S$) of the axial forces of the two pulleys becomes the force $F_O$ acting against the force $F_A$, as directed toward the pulley ratio of 1.0. The forward creep torque is eliminated. In this state, the creep torque is reduced substantially to 0 in the N-control so that the vehicle is held in the stopped state even if the brake is released.

Figure 13:
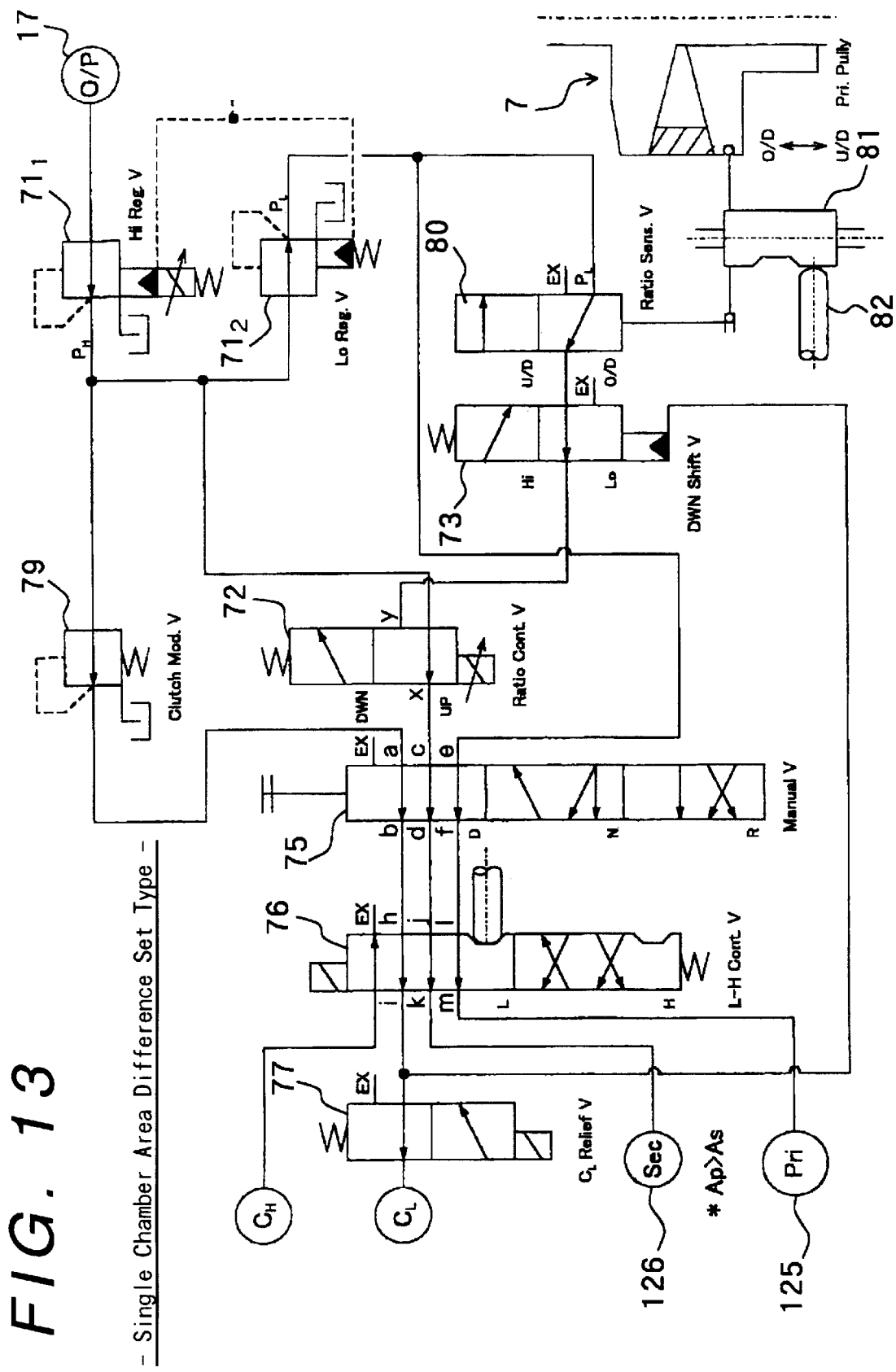
FIG. 13 is a diagram showing a hydraulic control mechanism for the infinitely variable transmission.

FIGS. 12 and 13 show an infinitely variable transmission and a hydraulic control mechanism, which are partially modified. The infinitely variable transmission 1 is identical to that of the preceding embodiment except for the difference in the hydraulic actuator, and the common portions are designated by the common reference numerals so that their description is omitted.

Flange members 120 and 121 are fixed on the ends of the respective bosses of the stationary sheaves 7a and 9a in the pulleys 7 and 9 at the primary and secondary sides, and drum members 122 and 123 are fixed on the back faces of the movable sheaves 7b and 9b. Between the back faces of the movable sheaves 7b and 9b and the flange members 120 and 121, respectively, there are formed oil pressure chambers 125 and 126 to form single chamber type hydraulic actuators 7e and 9e at the primary side and the secondary side, respectively. Oil pressures are fed to the oil pressure chambers 125 and 126 via oil passages 127 and 129, respectively, and pre-loading springs 130 and 131 are mounted under compression in the oil pressure chambers 125 and 126.

The hydraulic actuators 7e and 9e at the primary and secondary sides are set such that the effective pressure receiving area $A_p$ of the oil pressure chamber 125 at the primary side is larger by a predetermined amount than the effective pressure receiving area $A_s$ of the oil pressure chamber 126 at the secondary side ($A_p > A_s$), so that the creep torque takes a value of about 0 when equal oil pressures are applied to the two oil pressure chambers 125 and 126.

FIG. 13 shows a hydraulic control mechanism to be applied to the hydraulic actuators 7e and 9e having a single chamber. This hydraulic control mechanism is different from that shown in FIG. 6, in that it has two regulator valves. The hydraulic mechanism is equipped with a high regulator valve $71_1$ and a low regulator valve $71_2$.

In the D-range—low mode, the oil pressure regulated by the high regulator valve $71_1$ is fed to the low-clutch hydraulic servo $C_L$ through the clutch modulation valve 79, ports a and b of the manual valve 75, ports h and i of the low-high control valve 76 and the low-clutch relief valve 77. The oil pressure is regulated by the ratio control valve 72 so that the regulated oil pressure is fed to the secondary side oil pressure chamber 126 through ports c and d of the manual valve 75 and ports j and k of the low-high control valve 76. The oil pressure from the low regulator valve $71_2$ is fed to the primary side oil pressure chamber 125 through ports e and f of the manual valve 75 and ports l and m of the low-high control valve 76.

A constant low pressure based on the low regulator valve $71_2$ is fed to the primary side oil pressure chamber 125. A high pressure based on the high regulator valve $71_1$ is fed to the secondary side oil pressure chamber 126 and is properly regulated by the ratio control valve 72, so that the CVT 11 is shifted.

In the N-control, the ratio control valve 72 is switched down so that the constant low pressure from the low regulator valve $71_2$ is fed to the secondary side hydraulic servo 126 through the ratio sensing valve 80, the downshift valve 73, ports x and y of the ratio control valve 72, ports c and d of the manual valve 75 and ports j and k of the low-high control valve 76.

The equal oil pressures from the low regulator valve $71_2$ act upon the primary side oil pressure chamber 125 and the secondary side oil pressure chamber 126. The creep torque takes a value of about 0 on the basis of the area difference ($A_p > A_s$) of those two oil pressure chambers.

In the D-range—high mode, the low-high control valve 76 is switched so that the oil pressure from the clutch modulator valve 79 is fed to the high-clutch hydraulic servo $C_H$. At the same time, the constant low pressure from the low regulator valve $71_2$ is fed to the secondary side oil pressure chamber 126. The high pressure from the high regulator valve $71_1$ is fed to the primary side oil pressure chamber 125 and is properly regulated by the ratio control valve 72.

The hydraulic actuator shown in FIG. 12 is provided with the area difference between the two oil pressure chambers, as in the hydraulic actuator shown in FIG. 11, to reduce the creep torque substantially to zero. Without making the area difference between the two oil pressure chambers, however, the creep torque in the forward direction could naturally be established by feeding the equal oil pressures to the two oil pressure chambers, as in the hydraulic actuator shown in FIG. 1.

Figure 14:
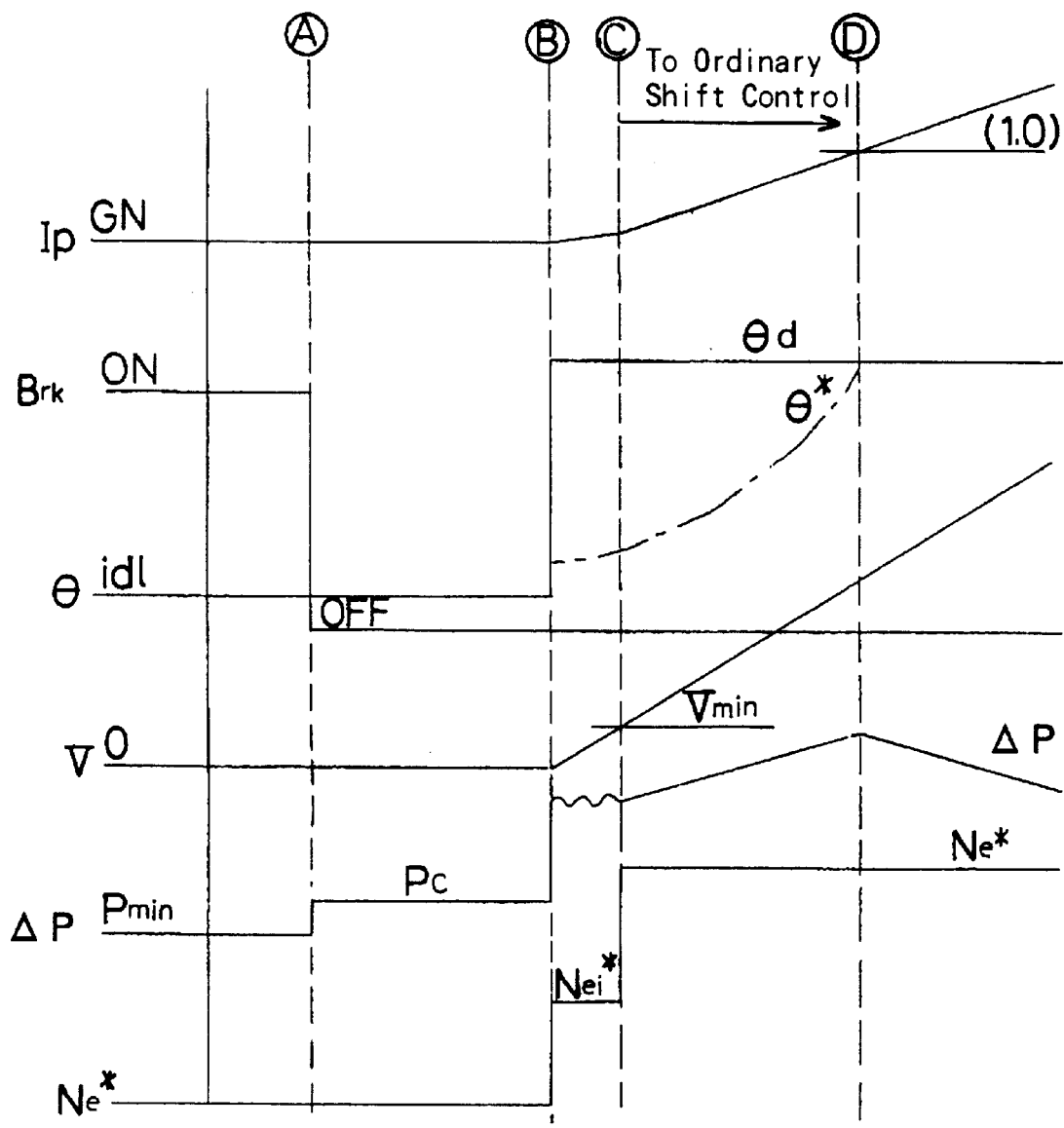
FIG. 14 is a timing chart illustrating a start control of the infinitely variable transmission.
Figure 16:
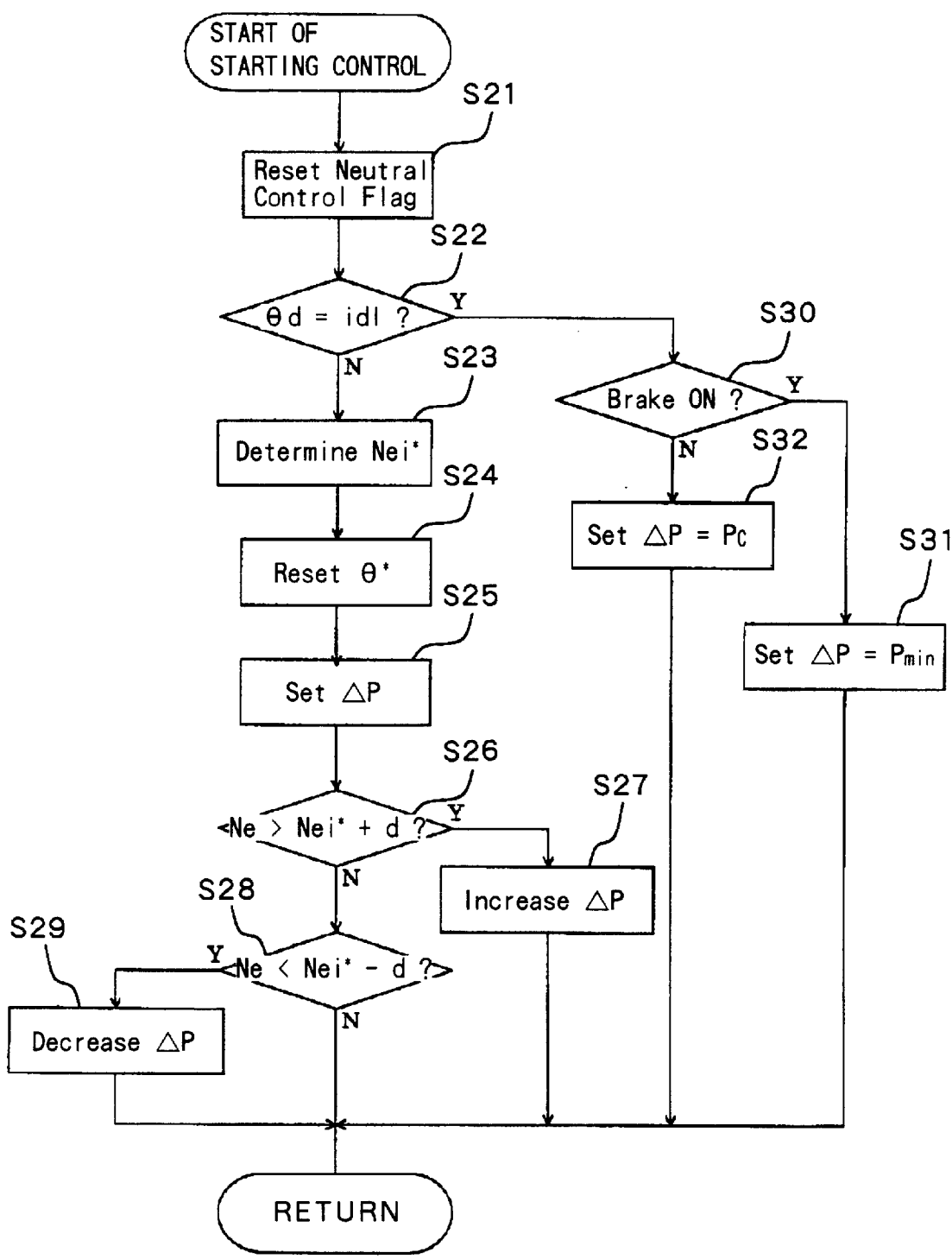
FIG. 16 is a flow chart showing a subroutine for a start control.

The flow chart of FIG. 16 and the time chart of FIG. 14 show the start control. The vehicle speed V becomes lower than the set minimum speed $V_{min}$ so that the N-control flag is reset (at step S21). It is decided by the idle switch 99 whether or not the throttle opening is in the idle state. When in the idle state, the neutral (N) control is executed. It is further decided by the brake pedal switch 98 (at step S30) whether or not the brake is ON.

When the vehicle is stopped, as shown in FIG. 14, the pulley ratio $I_p$ of the CVT 11 is at the GN point; a brake $B_{rk}$ is ON; the throttle opening $\theta$ is in the idle state; the oil pressure difference $\Delta P$ to act upon the two primary and secondary pulleys is at the minimum $P_{min}$ (at step S31), at which the vehicle is not running; and the target engine RPM $N_e^*$ is at the predetermined minimum (or the idle RPM). When the brake pedal $B_{rk}$ is released from this state, as indicated by point A, the predetermined oil pressure is fed to the secondary oil pressure chamber 59 at the secondary pulley side or to the oil pressure chamber 126. The oil pressure difference $\Delta P$ to act upon the two pulleys takes the value Pc to establish the predetermined creep force (at step S32) by the axial force difference, as based on the oil pressure difference, to act upon the two pulleys.

As indicated by point B, the driver depresses the accelerator (or throttle) pedal with an intention to start the vehicle. In order to establish the characteristics in which the stalling torque is raised according to the depression of the throttle torque, like the torque converter characteristics of the ordinary automatic transmission (A/T), as will be described hereinafter, a predetermined target engine RPM $N_{ei}^*$ is set (at step S23), and the throttle opening $\theta^*$ is reset (at step S17-4) to achieve the target RPM. At this time, since the infinitely variable transmission 1 generates a high torque in the vicinity of the GN point by the torque circulation, the engine output torque has to be drastically restricted by limiting the allowable torque of the belt. Therefore, the electronic throttle control means Q is instructed by the control unit to keep the actual throttle opening $\theta^*$ lower than the depression $\theta d$ of the accelerator pedal (or accelerator actuating means). The oil pressure to the second oil pressure chamber at the secondary pulley side is raised to set the differential pressure $\Delta P$ of the two pulleys in a rightward direction (at step S25), as illustrated in FIG. 10.

In the start control described above, the CVT 11 is in the vicinity of the gear neutral (GN) position so that the output torque of the infinitely variable transmission 1 is drastically amplified, as illustrated in FIG. 4. As a result, the input torque of the infinitely variable transmission, i.e., the output torque Te of the engine, is regulated by the allowable torque of the belt 10 so that it is restricted according to the pulley ratio, as plotted in FIG. 17. Specifically, when the pulley ratio $I_p$ is larger than 0.9, the amplification of the output torque is not so high that it does not need the restriction. In the vicinity of the GN point at the start, however, the amplification of the output torque is restricted so much that the maximum $\theta^*_{max}$ of the target throttle opening by the electronic control means Q is restricted to 2 to 3%, for example. Thus, the maximum throttle opening $\theta^*_{max}$ is determined from the pulley ratio, as plotted in FIG. 17.

Figure 17:
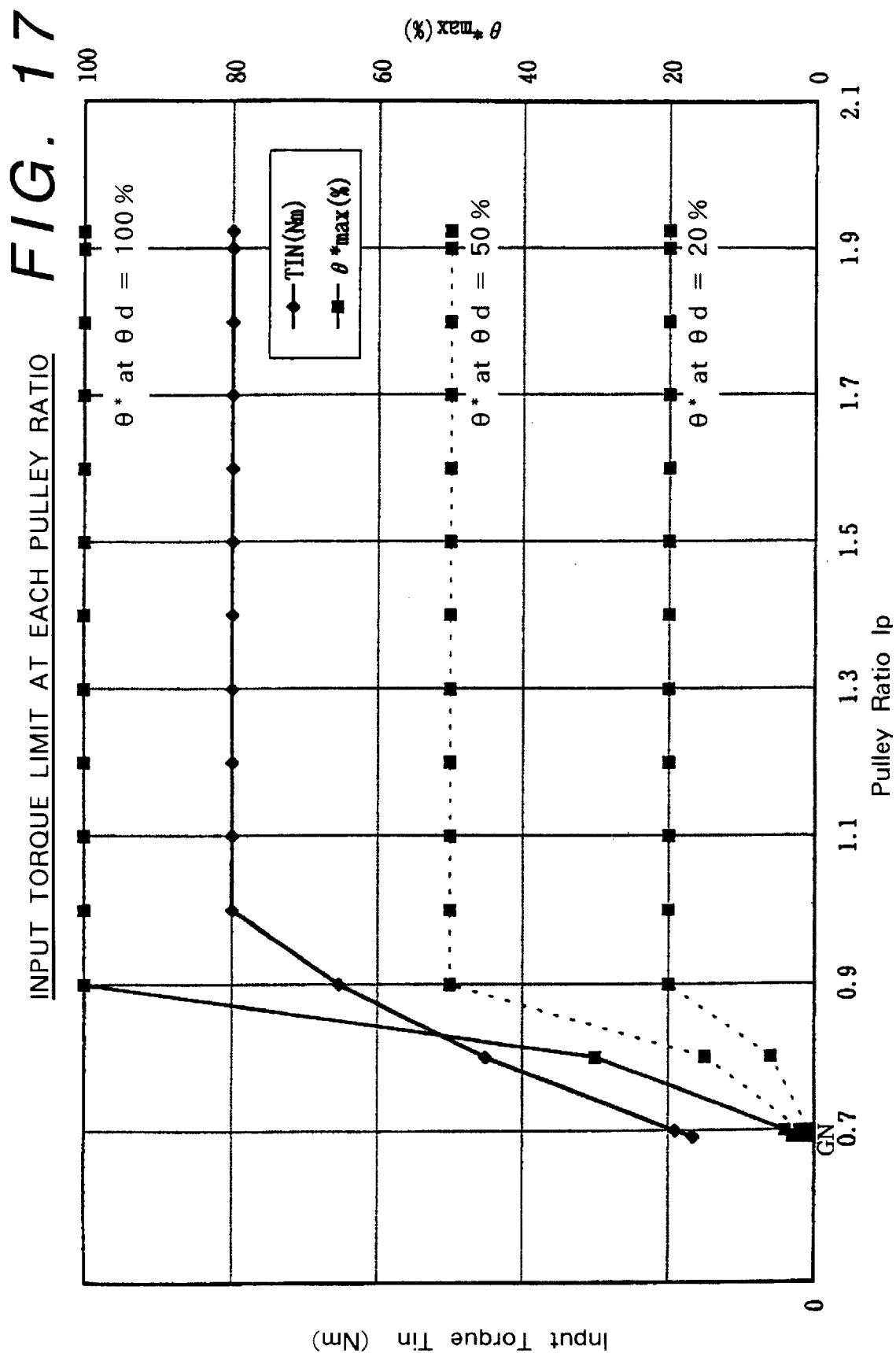
FIG. 17 is a diagram plotting an input torque limit at each pulley ratio.
Figure 18:
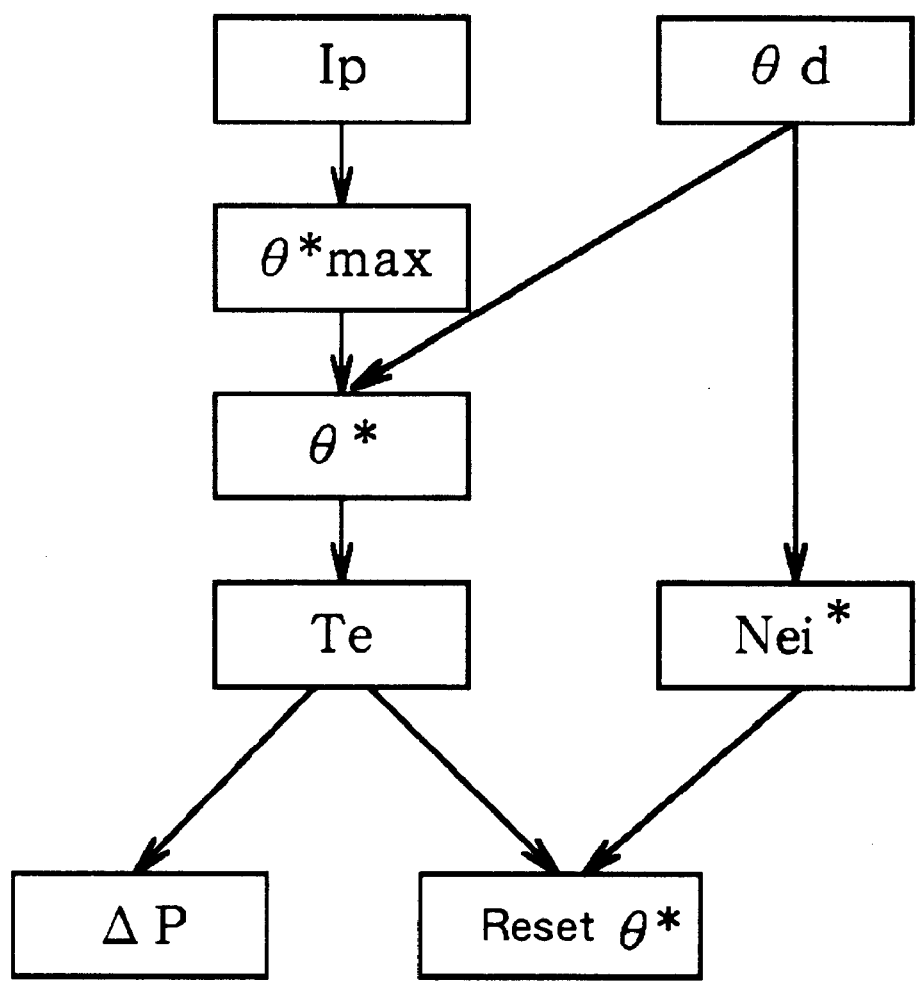
FIG. 18 is a diagram showing a process for determining a target throttle opening θ* at a stalling time.

As plotted in FIG. 17, the driver controls the acceleration with the depression (or actuation) of the accelerator pedal. For the maximum target throttle opening $\theta^*_{max}$ when the accelerator pedal depression $\theta$d is 100%, the target throttle opening $\theta^*$ is set at each pulley ratio in accordance with the ratio (e.g., 50% or 20%) of the throttle opening $\theta$d established by the driver to the full throttle (100%). Specifically, the target throttle opening $\theta^*$ is set, as illustrated in FIG. 18, by multiplying the maximum target throttle opening $\theta^*_{max}$, as based on the pulley ratio, by the throttle opening $\theta$d established by the driver. The maximum torque on the set target throttle opening $\theta^*$ is determined as the engine output torque Te.

When the throttle opening is extremely small, as described above, the equi-throttle curve of the engine output characteristics of the engine torque—engine RPM employing the throttle opening as the parameter falls rightward. When the throttle opening is held constant with the extremely low value, the engine torque tends to lower with the rise in the engine RPM.

Figure 15:
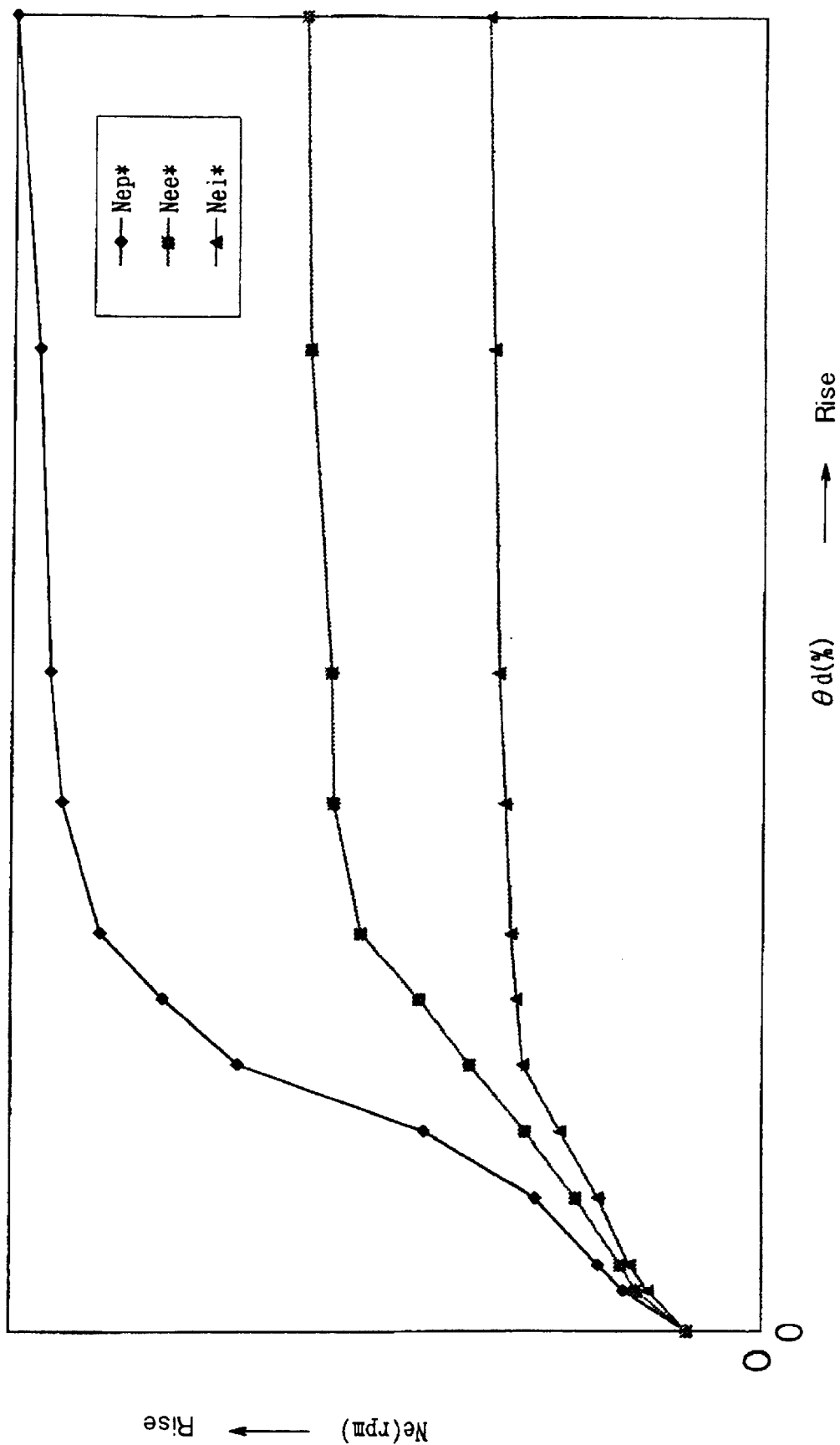
FIG. 15 is a diagram plotting target engine RPMs in individual states.

In the ordinary running state (in the low mode and in the high mode), the engine RPM is fluctuated by the load fluctuations such as the braking operation of the driver or the abrupt change in the running resistance. It is, therefore, necessary to consider the maximum torque on the equi-throttle curve in the corresponding target throttle opening $\theta^*$. In the stalling state in the start control, however, the load upon the engine is not influenced by the disturbances such as the change in the running resistance, but is instead determined by the control of the infinitely variable transmission. As a result, the target engine RPM $N_{ei}^*$, as based on the driver's established throttle opening $\theta$d, at the starting time (or stalling time) is determined (at step S23) from the map, as plotted in FIG. 15. The target throttle opening $\theta^*$ is updated (at step S24) with the map of the engine output characteristics from the target engine RPM $N_{ei}^*$ and the set engine output torque Te, and the pressure difference $\Delta P$ of the two pulleys of the CVT is set (at step S25) according to the determined engine output torque Te, so that the engine load is controlled so as to provide the target value to the engine RPM.

When the prevailing engine RPM $N_e$ exceeds the sum of the target RPM $N_{ei}^*$ for the start control and a predetermined value d (i.e., $N_e > N_{ei}^* + d$) (at step S26), the pressure difference $\Delta P$, in which the secondary side is higher, is controlled to increase (at step S27) thereby to urge the CVT 11 in the U/D direction (although at the GN point in fact), so that the engine load is increased to lower the engine RPM $N_e$. Unless $N_e > N_{ei}^* + d$, the prevailing engine RPM $N_e$ is compared with the difference of the start control target RPM $N_{ei}^*$ from the predetermined value d (at step S28). If $N_e > N_{ei}^* - d$, that is, if the prevailing engine RPM $N_e$ is within the target RPM range, it is kept as it is. If $N_e < N_{ei}^* - d$, the pressure difference $\Delta P$, in which the secondary side is higher, is controlled to lower (at step S29) thereby to urge the CVT 11 in the O/D direction (although at the GN point in fact) so that the engine load is reduced to raise the engine RPM $N_e$. The pressure difference of the two hydraulic actuators is controlled to change the load to act on the engine so that the RPM of the engine may reach the target value.

The engine output torque Te and the engine RPM $N_{ei}$ can be arbitrarily set by controlling the throttle opening by the electronic throttle controlling means 109. Characteristics similar to those of the conventional torque converters can be achieved by raising the engine RPM and the input torque of the transmission when the accelerator pedal is depressed. Here, since the engine output torque and the engine RPM can be individually set at will, it is possible to freely set not only the characteristics of the torque converter but also the characteristics of another starting unit such as the electromagnetic clutch or the manual clutch.

The vehicle is started with the engine RPM, engine output characteristics (or stalling characteristics) and creep torque thus far set. When the pulley ratio $I_p$ of the CVT 11 is slightly changed in the U/D direction so that the vehicle speed takes the predetermined low value $V_{min}$, as illustrated in FIG. 14, the control is shifted, as indicated by point C, from the start control to the ordinary shift control so that the engine RPM is set to the target RPM $N_e^*$ at the normal time. As plotted in FIG. 15, more specifically, in the control at the starting time for establishing the stalling torque, the engine RPM $N_e$ is held low, as indicated by $N_{ei}^*$, for each throttle opening $\theta$d. In the ordinary shift control, the engine RPM $N_e$ is controlled on the basis of the best output characteristic $N_{ep}^*$ or the best mileage characteristic $N_{ee}^*$. In this state, the pulley ratio of the CVT 11 is shifted in the U/D direction so that the vehicle speed V increases.

When the pulley ratio of the CVT takes about 1.0, as indicated by point D, the control of the throttle opening $\theta^*$ by the input torque restriction for preventing an excessive torque from acting upon the infinitely variable transmission such as the belt is released so that the throttle opening is equalized to the depression $\theta$d of the throttle pedal by the driver.

The above description is directed to the start in the forward direction when the shift lever is in the D-range. When the shift lever is in the R-range to start the vehicle in the backward direction, the predetermined oil pressure is applied to the second oil pressure chamber at the primary pulley side, to establish the backward warranting oil pressure error range of FIG. 10 so that a similar creep force is generated in the backward direction. Except for this point, the operations are similar to those shown in FIG. 14.

Figure 19:
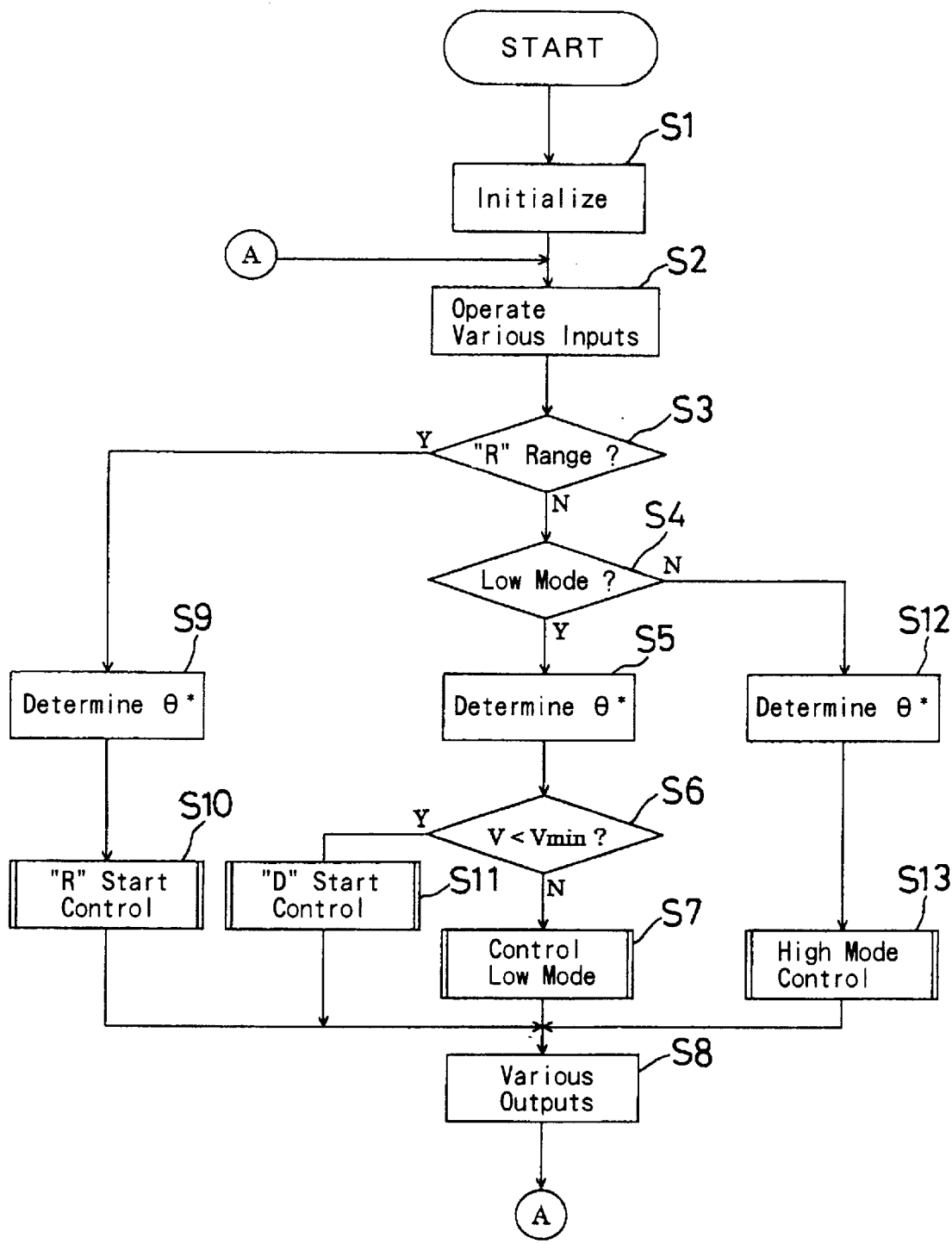
FIG. 19 is a flow chart showing a friction start at a backward running time by the infinitely variable transmission.
Figure 20:
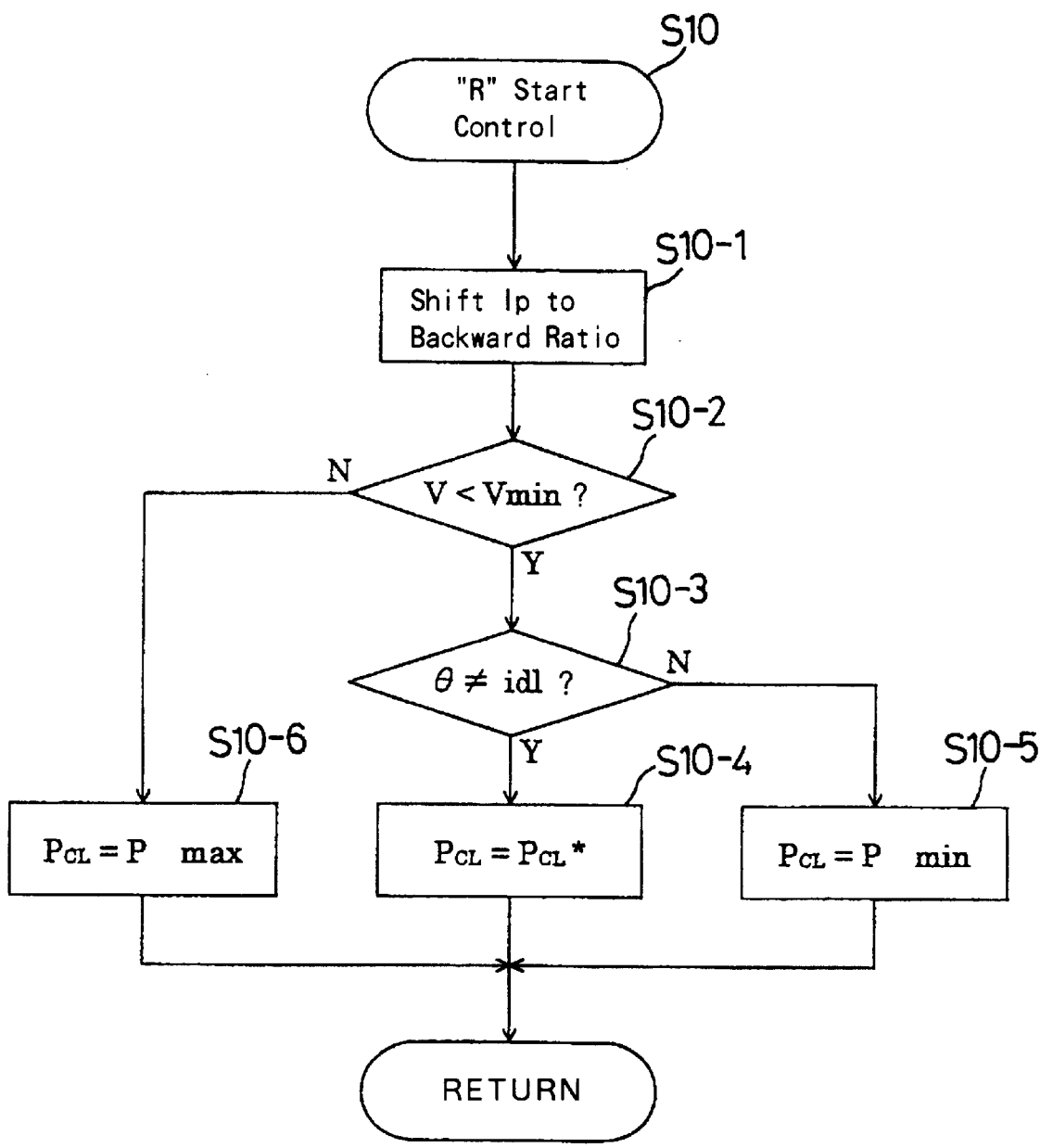
FIG. 20 is a flow chart showing a subroutine of the R start control.
Figure 21:
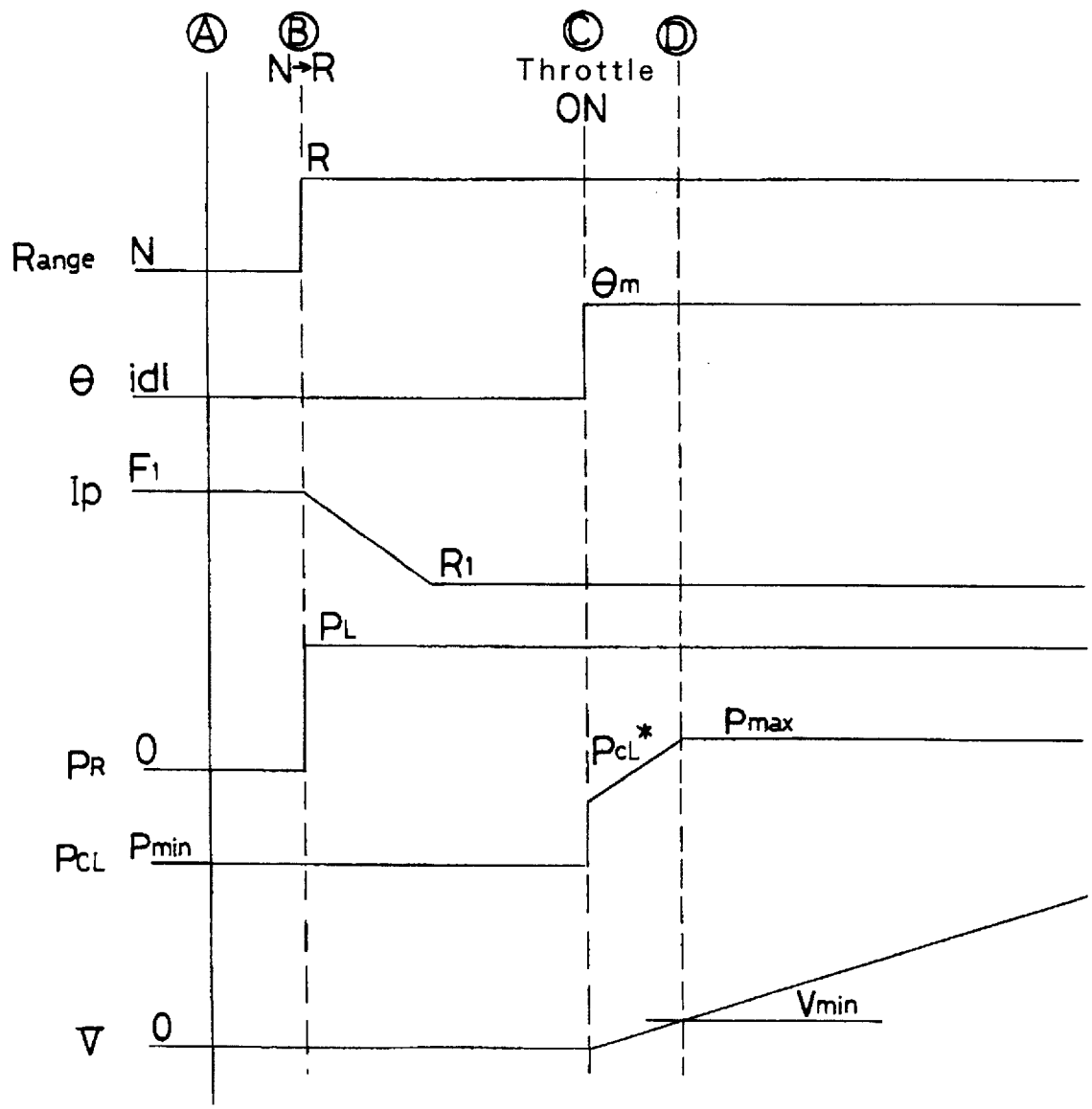
FIG. 21 is a timing chart of the friction start.

FIGS. 19 to 21 show an infinitely variable transmission for establishing the forward creep torque always at the neutral time by equalizing the effective pressure receiving areas of the oil pressure chambers, as shown in FIG. 1. This infinitely variable transmission is excellent in that the structure to be adopted can be simplified by making the primary and secondary sides of the CVT identical, and in that no special CVT control is required at the starting time for establishing the forward creep torque automatically. At the backward running time, however, the infinitely variable transmission is not preferable because the creep torque state is contrary to the intention of the driver. In the infinitely variable transmission, the vehicle is started at the backward (R) time by the friction control of the low clutch $C_L$.

FIG. 19 shows the individual steps in accordance with the invention. At step S1, all the settings are initialized prior to the start of operations. At step S2, the RPMs of the individual portions, the throttle opening, the range signal, the oil temperature are inputted and operated. At step S3, the range is decided from the preceding input result on whether or not the range is at "R". At step S4, it is decided whether or not the mode is in the Low. At step S5, the E/G throttle opening $\theta^*$ for the Low mode is determined according to the driver's throttle pedal opening $\theta^*$. At step S6, it is decided whether or not the vehicle speed is lower than the set value ($V_{min}$).

At step S7, the shift control in the Low mode is executed. At step S8, the outputs are fed to the individual solenoid and the electronic throttle on the basis of the operational result. At step S9, there is determined the E/G throttle opening θ* for the "R" range according to the driver's throttle opening θd. At step S10, the start control for the "R" range is made. At step S11, the start control for the "D" range is made. At step S12, the E/G throttle opening θ* for the High mode is determined according to the driver's throttle opening θd so that the shift control in the High mode is executed at step S13.

The start control for the backward running time is described with reference to the subroutine of the R-start control (S10), as shown in FIG. 20, and the time chart of the same control, as shown in FIG. 21. Here, the start control at the forward running time is identical to that shown in FIG. 14, except that a predetermined creep force is established even at the neutral time.

When the shift lever is in the N (neutral) range, as indicated by point A in FIG. 21, the predetermined oil pressures are fed to the two first oil pressure chambers 55 and 56 at the primary and secondary sides of FIG. 1, and the oil pressures of the two second oil pressure chambers 57 and 59 are released so that the pressure difference or the ratio pressure $P_R$ between the two pulleys takes the value 0 to set the pulley ratio $I_p$ of the CVT 11 is at a predetermined forward position $F_1$ (as should be referred to FIG. 4). An oil pressure $P_{CL}$ for the low clutch $C_L$ is at the low level $P_{min}$ so that the clutch $C_L$ is in the released state. As a result, the CVT 11 is in a predetermined forward creep force state, but not only the high clutch $C_H$ but also the low clutch $C_L$ is in the cut state so that the vehicle is stopped.

When the driver depresses the throttle pedal, as indicated by point C in FIG. 21, the throttle opening θ comes from the idle state to a predetermined opening position θm. When the throttle pedal switch is turned ON, the low clutch relief valve 77 is controlled by the duty control or the clutch application control solenoid 77a (as should be referred to FIG. 7), as formed of a linear solenoid valve, so that the low clutch oil pressure $P_{CL}$ is swept up at a predetermined angle ($P_{CL}=P_{CL}^*$: at step S10-4). As a result, the low clutch $C_L$ is smoothly applied by an increased application force while being slipped, so that the vehicle is started backward at a rising vehicle speed V by the friction start of the low clutch. When the vehicle speed V exceeds the predetermined speed $V_{min}$ (V<$V_{min}$: at step S10-2), the low clutch oil pressure $P_{CL}$ takes an application pressure $P_{max}$ ($P_{CL}=P_{max}$: at step S10-6) so that the low clutch $C_L$ is completely applied to effect the backward run by a predetermined backward pulley ratio $R_1$ of the CVT 11.

According to the first structure of the invention, with a construction as simple as to require no dedicated starter unit such as a torque converter, a desired creep torque can be established so that the vehicle can be smoothly started by the neutral control in which the self-convergence is made to reduce the output shaft RPM to 0.

According to the second structure of the invention, the creep torque can be established, as required, by setting the axial forces to act on the two pulleys.

According to the third structure of the invention, the creep torque to be established is 0 so that the neutral state is held in either the D-range or the R-range when the vehicle is stopped. The creep torque (i.e., the backward direction in the D-range or the R-range), as contrary to the intention of the driver, will not be established, but the vehicle can be started in the D-range and the R-range by a similar control to control the axial forces of the two pulleys.

According to the fourth structure of the invention, the creep torque can easily be set substantially to 0 with the simple construction and control by setting the predetermined difference between the effective pressure receiving areas of the oil pressure chambers of the two pulleys.

According to the fifth structure of the invention, the creep torque, as directed to correspond to each range, can be established by the simple control to switch the oil pressures to be fed to the oil pressure chambers.

According to the sixth structure of the invention, the first pulley ratio for the neutral position can be located at the overdrive side to enlarge the forward pulley ratio and to establish the forward creep torque so that the construction can be made preferable for the vehicle which is highly frequently used in the forward state while requiring a high gear ratio.

According to the seventh structure of the invention, by the simple construction in which the axial force actuating means is made identical for the two pulleys, it is possible to establish a high gear ratio in the forward state and a creep torque in the forward direction.

According to the eighth structure of the invention, by the simple construction in which the hydraulic actuators of the two pulleys have the identical structure and by the simple control in which the two oil pressure chambers are fed with the equal oil pressures, it is possible to establish a high gear ratio in the forward state and a creep torque in the forward direction.

According to the ninth structure of the invention, even if the axial balance of the axial force actuating means fails, in the D-range, the forward creep torque can be held at all times to start the vehicle, and in the R-range, a friction start is effected by making use of the clutch for establishing the torque circulation. By making the different controls for the D-range and the R-range, therefore, the switching between the forward and backward runs can be warranted. In the R-range, the frequency to start the vehicle is less than in the D-range so that the durability of the clutch by the friction start raises no problem. Since the input/output sides of the clutch rotate together, moreover, the infinitely variable transmission has little heat at the clutch applied time so that it does not need a special cooling unit.

According to the tenth structure of the invention, when the brake pedal is released, the predetermined creep torque is automatically established. When the brake pedal is depressed, therefore, the load due to the predetermined creep torque is not applied to the engine and the infinitely variable transmission to improve the mileage and to minimize the force to depress the brake. At the starting time, moreover, the vehicle can be smoothly started by the predetermined creep torque.

According to the eleventh structure of the invention, by the creep torque according to the amount of depression of a throttle pedal, characteristics similar to those of the torque converter can be achieved to start the vehicle in a manner to match the intention of the driver.

According to the twelfth structure of the invention, the engine RPM at the start can be arbitrarily set to set the stalling RPM freely in accordance with a conventional starter unit such as a torque converter, an electromagnetic clutch or a manual clutch.

According to the thirteenth structure of the invention, the engine output torque is controlled according to the ratio of the amount of actuation of the accelerator actuating means to the maximum limit torque while the accelerator actuating means is activated to the maximum, so that it can match the driving feel of the driver.

What is claimed is:

1. An infinitely variable transmission for use with an output shaft of an engine, comprising:

an input shaft connected with the output shaft of the engine;

an output member connected with wheels and coupled to a planetary gear;

a belt type continuously variable transmission including a first pulley associated with said input shaft, a second pulley coupled to said planetary gear, a belt movable on the first and second pulleys, and axial force actuating means for applying axial forces to said first and second pulleys to change a rotational ratio of said first and second pulleys, said belt type continuously variable transmission and said planetary gear operative to provide a first pulley ratio that provides a gear neutral state such that the RPM of said output member is substantially 0, and a second pulley ratio that does not provide a gear neutral state such that the RPM of the output member is not substantially 0, the first and second pulleys being structured such that the second pulley ratio is provided when the axial forces being applied to the first and second pulleys by the axial force actuating means are substantially equal;

said planetary gear including at least first, second and third rotary elements associated with said input shaft, said second pulley and said output member, respectively, so that a torque transmission direction may be changed between said first and second pulleys, and so that the output torque direction of said output member may be changed on the basis of a change in the pulley ratio of said belt type continuously variable transmission; and creep torque generating means for generating a creep force, such that, when said belt type continuously variable transmission is initially directed toward said second pulley ratio from said gear neutral state, axial forces are applied by the axial force actuating means to said first and second pulleys, the axial forces being set to predetermined values such that the continuously variable transmission may subsequently be directed toward the first pulley ratio from the second pulley ratio.

2. The infinitely variable transmission according to claim 1, wherein said creep torque generating means sets the axial forces that act on said first and second pulleys in accordance with a necessary creep torque.

3. The infinitely variable transmission according to claim 2, wherein said creep torque generating means sets the axial forces that act on said two pulleys so that the creep torque to be generated may be substantially 0.

4. The infinitely variable transmission according to claim 3, wherein said axial force actuating means includes hydraulic actuators individually provided for said first and second pulleys and having oil pressure chambers to be fed with oil pressure, and wherein effective pressure receiving areas of said oil pressure chambers are set so that the creep torque to be generated by said creep torque generating means may be substantially 0 when equal oil pressures are fed to said oil pressure chambers.

5. The infinitely variable transmission according to claim 4, wherein when the pulley ratio of said belt type continuously variable transmission is at said first pulley ratio, in a D-range, oil pressure to be fed to the oil pressure chamber of said second pulley is higher than that to said first pulley, and in an R-range, oil pressure to be fed to the oil pressure chamber of said first pulley is higher than that to said second pulley, and wherein said creep torque generating means generates a forward creep torque in the D-range and a backward creep torque in the R-range.

6. The infinitely variable transmission according to claim 1, wherein said first pulley ratio is set at a more overdrive side than the second pulley ratio and said creep torque generating means generates the creep torque in the forward direction.

7. The infinitely variable transmission according to claim 6, wherein said creep torque generating means sets said axial force actuating means so that the axial forces that act on said first and second pulleys may be substantially equalized.

8. The infinitely variable transmission according to claim 7, wherein said axial force actuating means includes hydraulic actuators individually provided for said first and second pulleys and having oil pressure chambers, and wherein said two oil pressure chambers have equal effective pressure receiving areas and are fed with equal oil pressures.

9. The infinitely variable transmission according to claim 1, further including a clutch interposed between said input shaft and the first rotary element of said planetary gear, and wherein at said gear neutral state in the D-range, said creep torque generating means generates a forward creep torque, and at said gear neutral state in the R-range, said belt type continuously variable transmission sets a backward pulley ratio and applies said clutch gradually.

10. The infinitely variable transmission according to claim 1, wherein when a brake pedal is released, said creep torque generating means controls the axial forces that act on said first and second pulleys so that a predetermined creep torque may be generated.

11. The infinitely variable transmission according to claim 1, wherein said creep torque generating means controls, when a throttle pedal is actuated by a driver, the axial forces that act on said first and second pulleys so that a creep torque according to the depression of said pedal may be generated.

12. The infinitely variable transmission according to claim 1, further including electronic throttle control means for controlling a throttle opening when starting from said gear neutral state, within a throttle opening, in which the output torque of said engine is within a limit torque set according to the pulley ratio of said belt type continuously variable transmission, such that the RPM of said engine may be a target RPM according to the amount of depression of a throttle pedal by a driver.

13. The infinitely variable transmission according to claim 12, wherein said electronic throttle control means controls said throttle opening according to the ratio of the amount of depression of said throttle pedal, with respect to said limit torque when said throttle pedal is depressed to the maximum by a driver.

14. The infinitely variable transmission according to claim 2, wherein the creep torque is set freely by changing axial forces acting on the first and second pulleys in accordance with a range position of at least one of a shift lever, a brake pedal and a throttle pedal.

* * * * *